US012471225B2

(12) United States Patent
Chen et al.

(10) Patent No.: US 12,471,225 B2
(45) Date of Patent: Nov. 11, 2025

(54) DETACHABLE CABLE CAGE FOR MULTI-NODE COMPUTING SYSTEM

(71) Applicant: Quanta Computer Inc., Taoyuan (TW)

(72) Inventors: Chao-Jung Chen, Taoyuan (TW); Chih-Wei Lin, Taoyuan (TW); Chin-Chu Chen, Taoyuan (TW); Ming-Yuan Hung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 297 days.

(21) Appl. No.: 18/113,316

(22) Filed: Feb. 23, 2023

(65) Prior Publication Data

US 2024/0237238 A1 Jul. 11, 2024

Related U.S. Application Data

(60) Provisional application No. 63/478,794, filed on Jan. 6, 2023.

(51) Int. Cl.
*H05K 5/02* (2006.01)
*G06F 1/16* (2006.01)
*H05K 7/14* (2006.01)

(52) U.S. Cl.
CPC ............ *H05K 5/0217* (2013.01); *G06F 1/16* (2013.01); *H05K 5/0247* (2013.01); *H05K 7/1491* (2013.01)

(58) Field of Classification Search
CPC .. H05K 5/0217; H05K 5/0247; H05K 7/1491; H05K 5/069; H05K 7/1447; H05K 7/1492; H05K 7/1452; G06F 1/16; G06F 1/183; H04Q 1/06
See application file for complete search history.

(56) References Cited

U.S. PATENT DOCUMENTS

| | | | | |
|---|---|---|---|---|
| 5,216,579 A | * | 6/1993 | Basara | G06F 1/184 174/481 |
| 6,326,547 B1 | * | 12/2001 | Saxby | H02G 11/00 312/273 |
| 6,373,721 B2 | * | 4/2002 | Lecinski | H05K 7/1491 361/825 |
| 6,435,354 B1 | * | 8/2002 | Gray | H05K 7/1491 211/26 |
| 6,538,904 B1 | * | 3/2003 | Isely | H04Q 1/09 361/828 |

(Continued)

*Primary Examiner* — Allen L Parker
*Assistant Examiner* — Martin Antonio Asmat Uceda
(74) *Attorney, Agent, or Firm* — NIXON PEABODY LLP

(57) ABSTRACT

A multi-node computing system is disclosed. The multi-node computing system includes a chassis and a detachable cable cage removably mounted within the chassis. The detachable cable cage includes a base frame assembly having a bottom plate connecting a first plate and a second plate. The first and second plate face each other and extend across a width of the base frame assembly between a first side and a second side of the base frame assembly. The detachable cable cage further includes a first panel assembly movingly coupled to the first side of the base frame assembly and a second panel assembly movingly coupled to the second side of the base frame assembly. The first panel assembly and/or the second panel assembly is movable between a closed position and an open position, and an internal space of the detachable cable cage is accessible in the open position.

20 Claims, 22 Drawing Sheets

(56) References Cited

U.S. PATENT DOCUMENTS

| | | | | |
|---|---|---|---|---|
| 6,543,626 B1* | 4/2003 | Mendoza | H04Q 1/062 | |
| | | | 361/829 | |
| 6,590,785 B1* | 7/2003 | Lima | H04Q 1/021 | |
| | | | 361/825 | |
| 6,600,665 B2* | 7/2003 | Lauchner | H05K 7/1491 | |
| | | | 361/825 | |
| 6,766,093 B2* | 7/2004 | McGrath | H04Q 1/064 | |
| | | | 379/327 | |
| 6,930,247 B2* | 8/2005 | Chen | G06F 1/187 | |
| | | | 174/64 | |
| 7,000,784 B2* | 2/2006 | Canty | H04Q 1/064 | |
| | | | 211/26 | |
| 7,097,047 B2* | 8/2006 | Lee | H05K 7/1491 | |
| | | | 361/825 | |
| 7,352,947 B2* | 4/2008 | Phung | G02B 6/4459 | |
| | | | 248/65 | |
| 7,480,154 B2* | 1/2009 | Lawrence | H05K 7/1491 | |
| | | | 174/72 A | |
| 7,806,489 B2* | 10/2010 | Selvidge | G11B 33/128 | |
| | | | 312/222 | |
| 7,855,881 B2* | 12/2010 | Tsai | G06F 1/187 | |
| | | | 312/223.1 | |
| 7,916,502 B2* | 3/2011 | Papakos | H05K 7/20563 | |
| | | | 174/72 A | |
| 8,237,052 B2* | 8/2012 | Adducci | H05K 7/186 | |
| | | | 312/265.2 | |
| 8,410,364 B2* | 4/2013 | Dunwoody | H05K 7/1491 | |
| | | | 174/72 A | |
| 8,605,459 B2* | 12/2013 | Papakos | H05K 7/1425 | |
| | | | 361/825 | |
| 8,625,285 B2* | 1/2014 | Peng | H05K 7/1491 | |
| | | | 361/724 | |
| 8,655,137 B2* | 2/2014 | Baldassano | G02B 6/44526 | |
| | | | 174/50 | |
| 9,019,707 B2* | 4/2015 | Xu | H05K 7/1492 | |
| | | | 361/679.48 | |
| 9,058,150 B2* | 6/2015 | Ning | G06F 1/16 | |
| 9,089,068 B2* | 7/2015 | Sechrist | H05K 7/1447 | |
| 9,606,318 B2* | 3/2017 | Grandidge | H01R 13/73 | |
| 9,685,749 B1* | 6/2017 | Hsu | H01R 33/74 | |
| 9,736,959 B2* | 8/2017 | Harvilchuck | F16L 3/26 | |
| 9,888,603 B1* | 2/2018 | Vargas | H05K 7/14 | |
| 10,154,609 B2* | 12/2018 | Umematsu | H05K 7/1491 | |
| 10,694,265 B2* | 6/2020 | Sticker | H04Q 1/064 | |
| 11,286,982 B2* | 3/2022 | Hsieh | H05K 7/02 | |
| 11,432,426 B2* | 8/2022 | Triplett | G06F 21/86 | |
| 11,502,488 B2* | 11/2022 | Fariello | H04Q 1/06 | |
| 11,582,538 B2* | 2/2023 | O'Young | H02G 3/045 | |
| 11,622,467 B2* | 4/2023 | Mckeever | H05K 7/1489 | |
| | | | 361/679.02 | |
| 11,632,871 B2* | 4/2023 | Hattangadi | H05K 7/1452 | |
| | | | 361/801 | |
| 11,706,894 B2* | 7/2023 | O'Young | H02G 3/0418 | |
| | | | 248/68.1 | |
| 11,728,630 B2* | 8/2023 | Adachi | H01B 13/012 | |
| | | | 29/857 | |
| 2006/0158842 A1* | 7/2006 | McAnally | G06F 1/183 | |
| | | | 361/679.33 | |
| 2008/0049949 A1* | 2/2008 | Snider | H05K 13/00 | |
| | | | 381/86 | |
| 2008/0111032 A1* | 5/2008 | Yang | H05K 7/1491 | |
| | | | 248/68.1 | |
| 2008/0236858 A1* | 10/2008 | Quijano | G06F 1/181 | |
| | | | 174/50 | |
| 2009/0242233 A1* | 10/2009 | Ueda | H05K 7/1491 | |
| | | | 312/334.7 | |
| 2012/0241187 A1* | 9/2012 | Gong | H05K 7/1491 | |
| | | | 174/68.3 | |
| 2013/0301225 A1* | 11/2013 | Gong | H05K 7/1491 | |
| | | | 361/826 | |
| 2013/0342088 A1* | 12/2013 | Gommel | H05K 5/15 | |
| | | | 312/223.1 | |
| 2014/0097000 A1* | 4/2014 | Lin | H05K 7/1491 | |
| | | | 174/135 | |
| 2015/0342081 A1* | 11/2015 | Chang | H05K 7/18 | |
| | | | 361/679.02 | |
| 2021/0385961 A1* | 12/2021 | Hsieh | H05K 7/1407 | |
| 2022/0210941 A1* | 6/2022 | Knychalski | G02B 6/4457 | |

* cited by examiner

DETACHABLE CABLE CAGE FOR MULTI-NODE COMPUTING SYSTEM

CROSS-REFERENCE TO RELATED APPLICATIONS

This application claims priority from and benefit of U.S. Provisional Patent Application Ser. No. 63/478,794, filed on Jan. 6, 2023, titled "Easy And Configurable Cable Connection For Multi-Nodes System," which is hereby incorporated by reference herein in its entirety.

FIELD OF THE INVENTION

The present invention relates generally to a cable management system for a multi-node computing system, and more specifically, to a detachable cable cage of a multi-node computing system.

BACKGROUND OF THE INVENTION

In general, a multi-node server or computing system 100 has a chassis 110 and a cage 120 having a narrow and deep space. The cage 120 contains a plurality of cables 130 and a technician may be able to reach the plurality of cables 130 only from the top side of cage 120, as exemplified in FIG. 1. The cage 120 is fixed to the chassis 110 of the multi-node computing system 100, and thus, the cables 130 can be managed or routed only within the cage 120. However, cables 130 located deep in the internal space of the cage 120 are not clearly visible from the top side of the cage 120 and it would be difficult to reach them. Further, the internal space of the cage 120 is closed and not big enough for hands to freely move therein. Thus, it would take much time and is difficult to perform cable management services in the tight space within the cage 120. For example, see FIG. 1. In particular, when the height of the chassis 110 and/or cage 120 is greater, it would be more difficult to reach the deeper internal space of the cage 120, in particular, the lower area of the internal space.

Therefore, a need exists for a system allowing free movement of hands and easy management of cables within a cage. A need also exists for a mechanism allowing easy access to the deep space within the cage.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In view of the above-described problem with the conventional cable cage fixed to a chassis of the computing system, the present application discloses a multi-node computing system with a detachable cable cage that can be open for easier access to an internal space of the cable cage.

According to certain aspects of the present disclosure, a multi-node computing system is disclosed. According to various embodiments, the multi-node computing system includes a chassis; one or more electronic devices mounted within the chassis: and a detachable cable cage removably mounted within the chassis. The detachable cable cage includes a base frame assembly having a bottom plate connecting a first plate and a second plate, the first plate extending generally vertically from one end of the bottom plate, the second plate extending generally vertically from another end of the bottom plate. The first and second plate face each other and extend across a width of the base frame assembly between a first side and a second side of the base frame assembly. The detachable cable cage includes a first panel assembly forming one side of the detachable cable cage and a second panel assembly forming another side of the detachable cable cage. The first panel assembly is movingly coupled to the first side of the base frame assembly and the second panel assembly is movingly coupled to the second side of the base frame assembly. The first panel assembly and the second panel assembly are generally parallel such that the first panel assembly faces the second panel assembly.

In various embodiments, the multi-node computing system further includes a plurality of cables positioned within the detachable cable cage. The plurality of cables is connected to the one or more electronic devices.

In various embodiments, the detachable cable cage is fixed to the chassis via toolless fasteners.

In various embodiments, the first panel assembly is movable between a closed position and an open position. An internal space of the detachable cable cage is accessible in the open position.

In various embodiments, the second panel assembly is movable between a closed position and an open position. An internal space of the detachable cable cage is accessible in the open position.

In various embodiments, the first panel assembly is coupled to the base frame assembly via a rotatable hinge. In various embodiments, the first panel assembly is slidable along grooved rails formed on the first plate and the second plate of the base frame assembly. In various embodiments, the first panel assembly is coupled to the base frame assembly via a fastening mechanism with toolless screws.

In various embodiments, the second panel assembly is coupled to the base frame assembly via a rotatable hinge. In various embodiments, the second panel assembly is slidable along grooved rails formed on the first plate and the second plate of the base frame assembly. In various embodiments, the second panel assembly is coupled to the base frame assembly via a fastening mechanism with toolless screws.

In various embodiments, the first panel assembly has a lattice allowing passage of the plurality of cables through the lattice. In various embodiments, the second panel assembly is meshed such that air can flow through meshes.

In various embodiments, the chassis includes at least a plurality of location pins configured to be engaged with holes formed on the bottom plate of the base frame assembly. In various embodiments, the chassis includes a plurality of guiding pins configured to be engaged with holes formed on the first and second plates of the base frame assembly. In various embodiments, the chassis includes a plurality of holes configured to be engaged with pins or T-pins located on the second panel assembly. In various embodiments, the chassis includes at least two thumbscrews configured to be engaged with screw holes formed on the second panel assembly.

When the cable cage is assembled to the chassis, in various embodiments, the plurality of location pins engages with the holes formed on the bottom plate of the base frame assembly. In various embodiments, the plurality of guiding pins engages with the holes formed on the first and second plates of the base frame assembly. In various embodiments, the plurality of holes engages with the pins or T-pins located on the second panel assembly. In various embodiments, the at least two thumbscrews engage with the screw holes formed on the second panel assembly.

According to other aspects of the present disclosure, a multi-node computing system configured to receive one or more electronic devices is disclosed. According to various embodiments, the multi-node server system includes a chassis; a detachable cable cage removably mounted within the chassis; and a plurality of cables positioned within the detachable cable cage and connected to the one or more electronic devices. The detachable cable cage includes a base frame assembly having a bottom plate connecting a first plate and a second plate facing each other and extending across a width of the base frame assembly between a first side and a second side of the base frame assembly. The detachable cable cage further includes a back panel assembly movingly coupled to the first side of the base frame assembly. The back panel assembly is movable between a closed position and an open position. An internal space of the cable cage is exposed when the cable cage is detached from the chassis and when the back panel assembly is in the open position. The detachable cable cage further includes a front panel assembly movingly coupled to the second side of the base frame assembly. The front panel assembly is movable between a closed position and an open position. The internal space of the cable cage is exposed when the cable cage is detached from the chassis and when the front panel assembly is in the open position.

According to various embodiments, at least one of the back panel assembly and the front panel assembly is coupled to the base frame assembly via a rotatable hinge. According to various embodiments, at least one of the back panel assembly and the front panel assembly is coupled to the base frame assembly via grooved rails formed on the first plate and the second plate of the base frame assembly. According to various embodiments, at least one of the back panel assembly and the front panel assembly is coupled to the base frame assembly via a fastening mechanism with screws.

According to various embodiments, the chassis includes a plurality of location pins configured to be engaged with holes formed on the bottom plate of the base frame assembly. According to various embodiments, the chassis includes a plurality of guiding pins configured to be engaged with holes formed on the first and second plates of the base frame assembly. According to various embodiments, the chassis includes a plurality of holes configured to be engaged with pins or T-pins located on the front panel assembly. According to various embodiments, the chassis includes at least two thumbscrews configured to be engaged with screw holes formed on the front panel assembly.

According to other aspects of the present disclosure, a method for servicing a plurality of cables within a cable cage detachably coupled to a multi-node computing system is disclosed. According to various embodiments, the method includes detaching the cable cage from a chassis of the multi-node computing system and opening a first panel assembly or a second panel assembly of the cable cage movingly coupled to a base frame assembly of the cable cage such that the cable cage is placed in an open configuration. The internal space of the detachable cable cage is accessible in the open configuration. The method further includes servicing the plurality of cables to route or connect the plurality of cables to one or more electronic devices mounted within the chassis and closing the first panel assembly or second panel assembly followed by assembling the cable cage that is in a closed configuration to the chassis.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1:
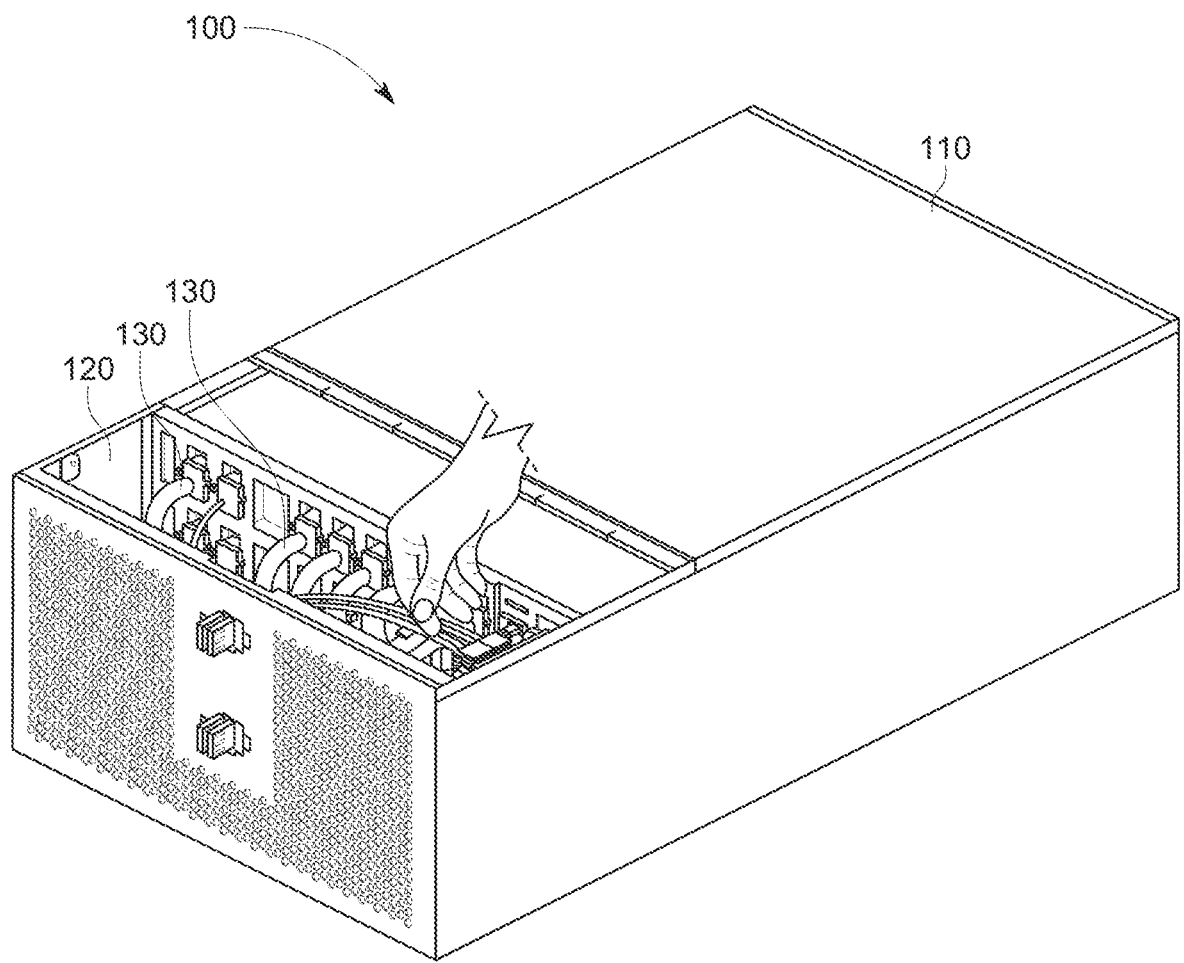
FIG. 1 is a perspective view of prior art multi-node computing systems having a fixed cable cage.

Elements in the figures are illustrated for simplicity and clarity and have not necessarily been drawn to scale. For example, the dimensions and/or relative positioning of some of the elements in the figures may be exaggerated relative to other elements to help improve understanding of various features.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2A:
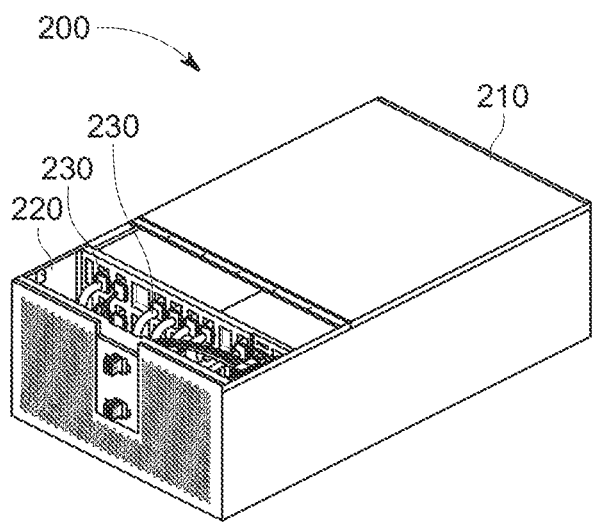
FIGS. 2A and 2B are perspective views of a multi-node computing system with a detachable cable cage, according to certain aspects of the present disclosure.
Figure 2B:
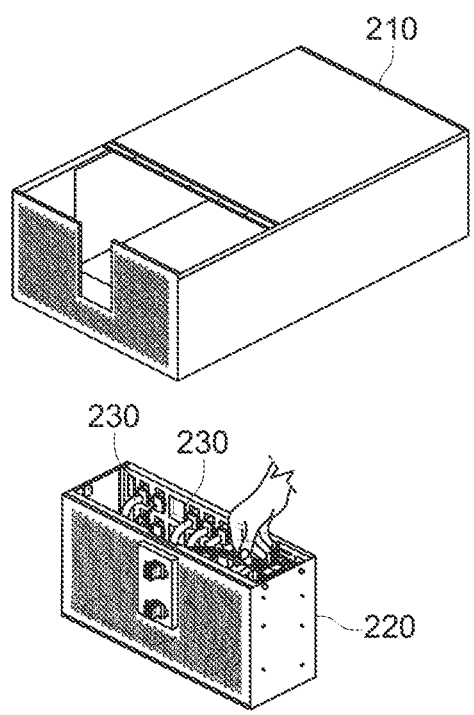

A multi-node computing system 200 according to various embodiments of the present invention is shown in FIGS. 2A and 2B. For example, the multi-node computing system 200 is a multi-node server. In general, multi-node server has an enclosure where two or more independent computer servers or nodes are inserted. Further, in general, the combined power for all nodes is distributed through the shared power supply(ies). FIG. 2A shows a multi-node computing system 200 according to various embodiments of the present invention. The multi-node computing system 200 includes a chassis 210, a detachable cable cage 220 removably mounted within the chassis 210, and a plurality of cables 230 positioned within the cable cage 220. Referring to FIG. 2B, the cable cage 220 can be detached from the chassis 210 such that the chassis 210 and the cable cage 220 are completely separated. The present invention can be applied to chassis with varying heights such that a multi-node computing system with a greater height or depth can also have a detachable cable cage removably mounted within the chassis.

Figure 3:
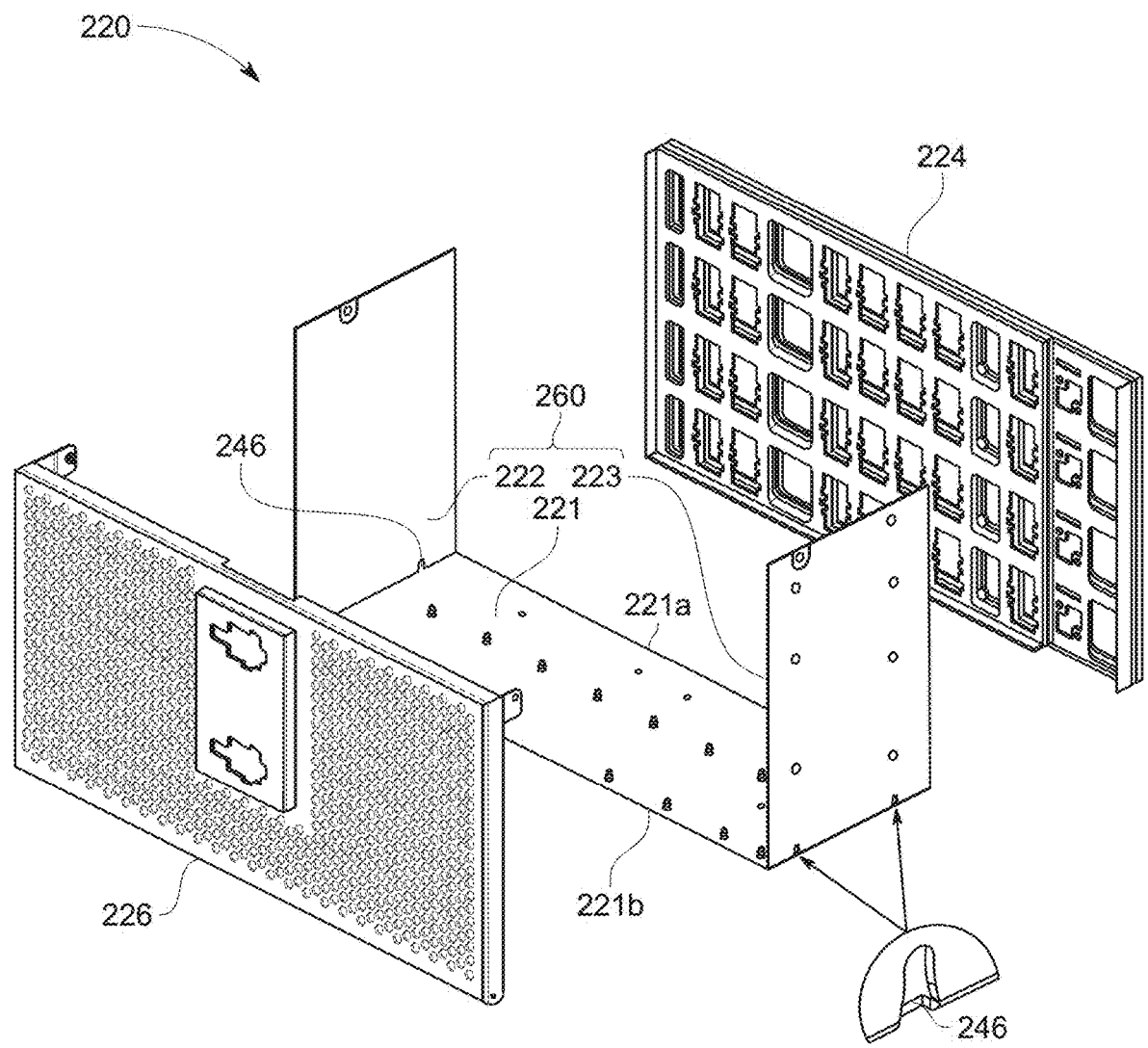
FIG. 3 is a perspective exploded view of a detachable cable cage of a multi-node computing system, according to certain aspects of the present disclosure.

Referring to FIG. 3, the detachable cable cage 220 includes a base frame assembly 260 having a bottom plate 221 connecting a first plate 222 and a second plate 223. The first plate 222 extends generally vertically from one end of the bottom plate 221, and the second plate 223 extends generally vertically from another end of the bottom plate 221. The first plate 222 and the second plate 223 face each other and extend across a width of the base frame assembly 260 between a first side 221a and a second side 221b of the base frame assembly.

The detachable cable cage 220 further includes a first panel assembly 224 forming one side of the detachable cable cage 220. The first panel assembly 224 is movingly or detachably coupled to the first side 221a of the base frame assembly 260. The detachable cable cage 220 further includes a second panel assembly 226 forming another side of the detachable cable cage 220. The second panel assembly 226 is movingly or detachably coupled to the second side 221b of the base frame assembly 260. In some embodiments, the first panel assembly 224 and the second panel assembly 226 are generally parallel such that the first panel assembly 224 faces the second panel assembly 226.

In some embodiments, the first panel assembly 224 is movable between a closed position and an open position, and an internal space of the detachable cable cage 220 is accessible in the open position. In some embodiments, the second panel assembly 226 is movable between a closed position and an open position, and the internal space of the detachable cable cage 220 is accessible in the open position. In some embodiments, both the first and second panel assemblies 224, 226 are movable between a closed position and an open position. In some embodiments, the internal space of the detachable cable cage 220 is accessible only when at least one of the first panel assembly 224 or the second panel assembly 226 is in the open position. That is, the internal space of the detachable cable cage 220 is fully exposed by opening at least one side of the detached cable cage 220, thus making it possible to easily handle cables 230 within the cable cage 220 from a side of the cable cage 220. When the cable cage 220 is in a closed configuration, the internal space can be accessed only from the top side of the cable cage 220, thus, making it difficult to reach the lower area of the deep space within the cable cage 220.

Figure 4A:
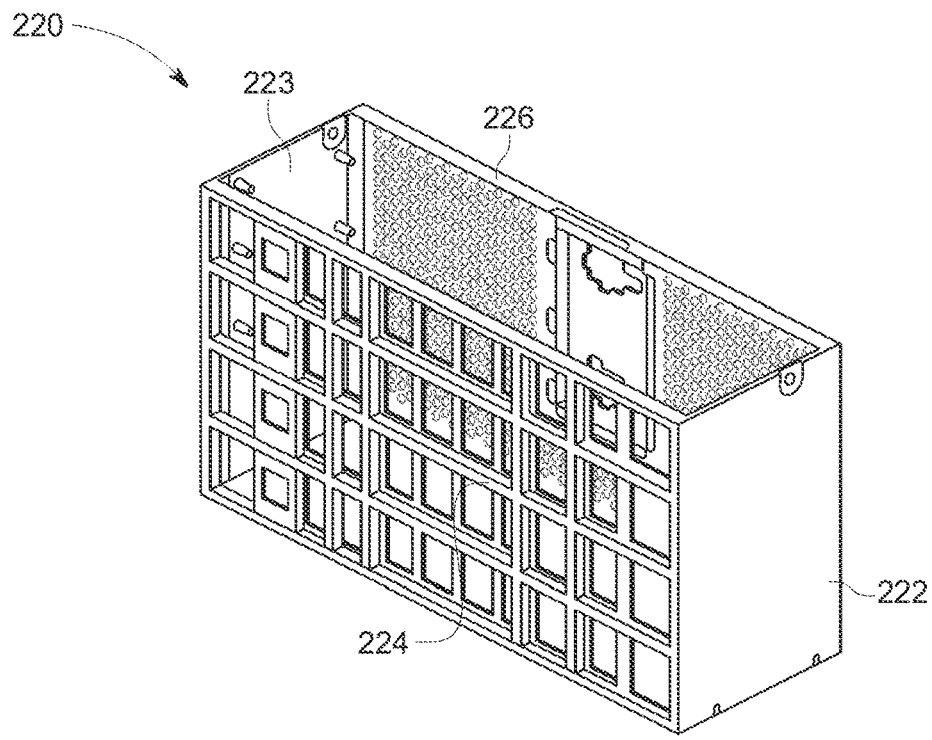
FIGS. 4A, 4B, 4C, and 4D are perspective views of a detachable cable cage with a flappable back panel assembly, according to certain aspects of the present disclosure.
Figure 4B:
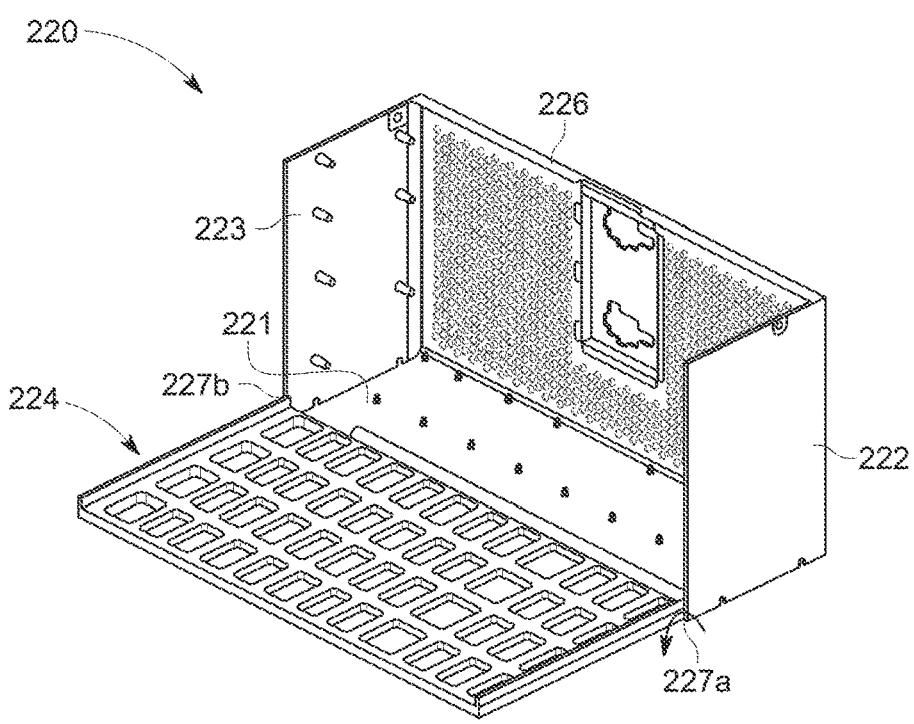
Figure 4C:
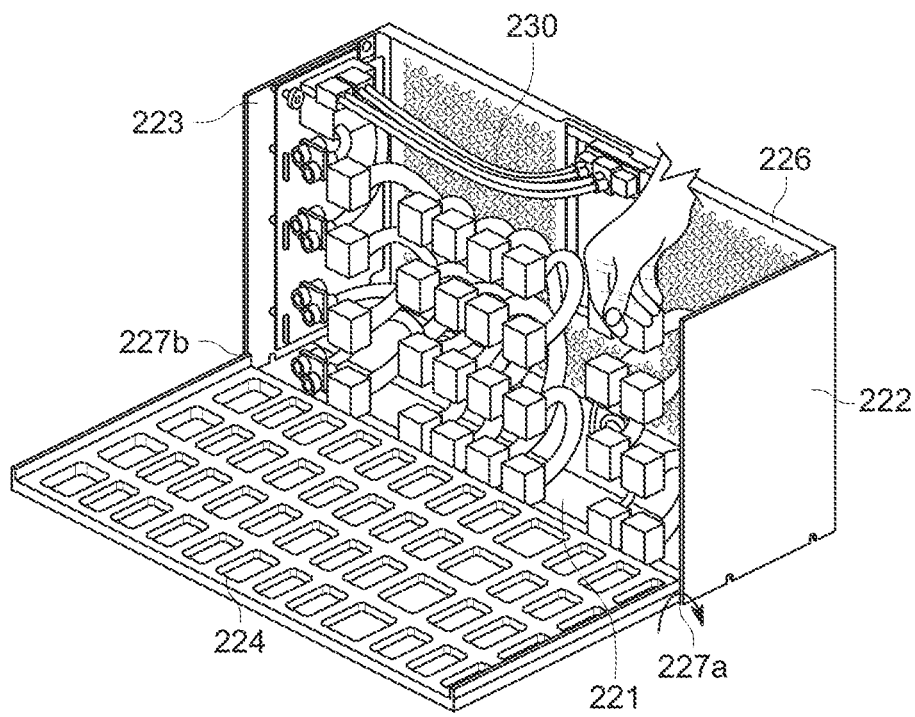
Figure 4D:
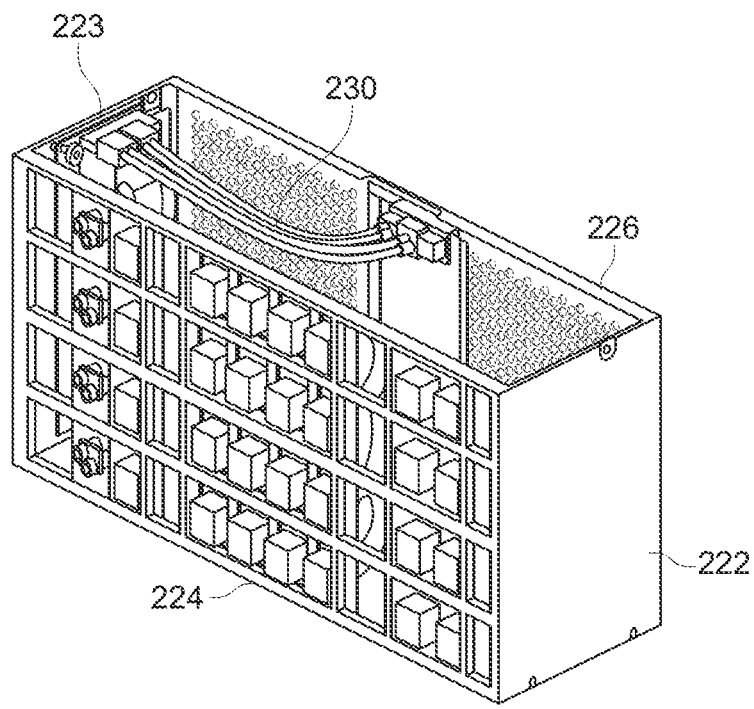

Referring to FIGS. 4A-4D, in some embodiments, the first panel assembly 224 is coupled to the base frame assembly 260 via rotatable hinges 227a, 227b. For example, one hinge 227a couples one end of the first panel assembly 224 to the first plate 222, and another hinge 227b couples the other end of the first panel assembly 224 to the second plate 223. Alternatively, one hinge 227a couples one end of the first panel assembly 224 to a portion of the bottom plate 221, and another hinge 227b couples the other end of the first panel assembly 224 to another portion of the bottom plate 221. Thus, the first panel assembly 224 is always coupled to the base frame assembly regardless of whether the base frame assembly 260 is in a closed configuration or in an open configuration. In some embodiments, a fastening mechanism, such as screws, is necessary to hold the first panel assembly 224 in the closed position. The fastening mechanism needs to be released to open the first panel assembly 224, as shown in FIGS. 4A and 4B. As shown in FIG. 4C, the plurality of cables 230 can be handled easily once the first panel assembly 224 is in the open position. The first panel assembly 224 can be put back to the closed position after the plurality of cables 230 are serviced, as shown in FIGS. 4C and 4D.

Figure 5A:
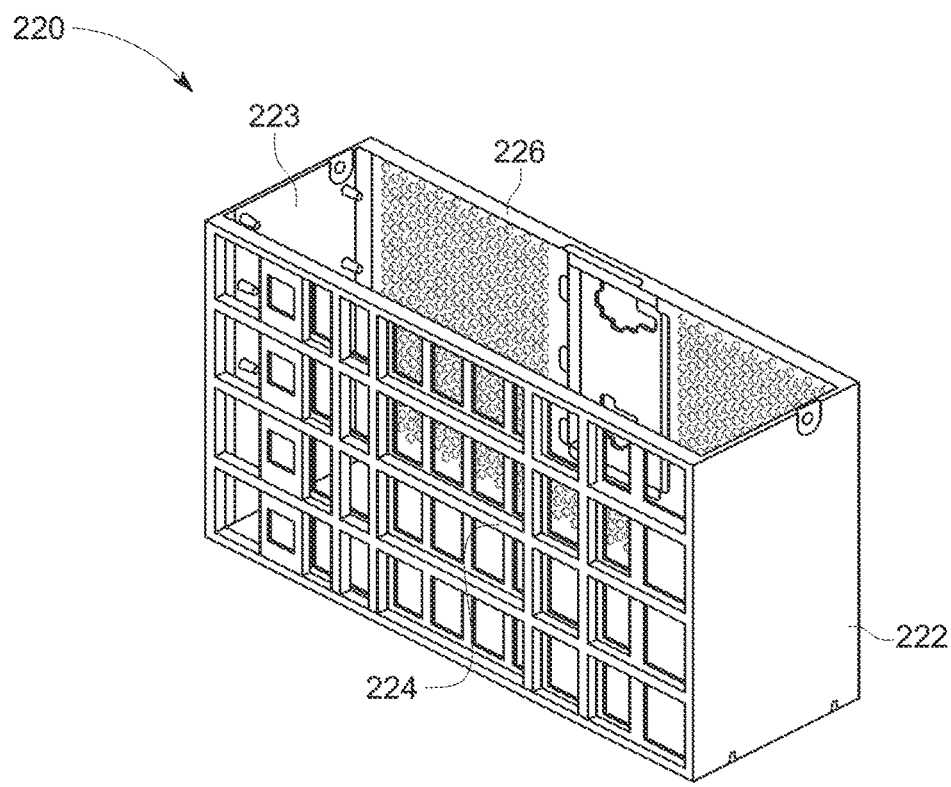
FIGS. 5A, 5B, 5C, and 5D are perspective views of a detachable cable cage with a slidable back panel assembly, according to certain aspects of the present disclosure.
Figure 5B:
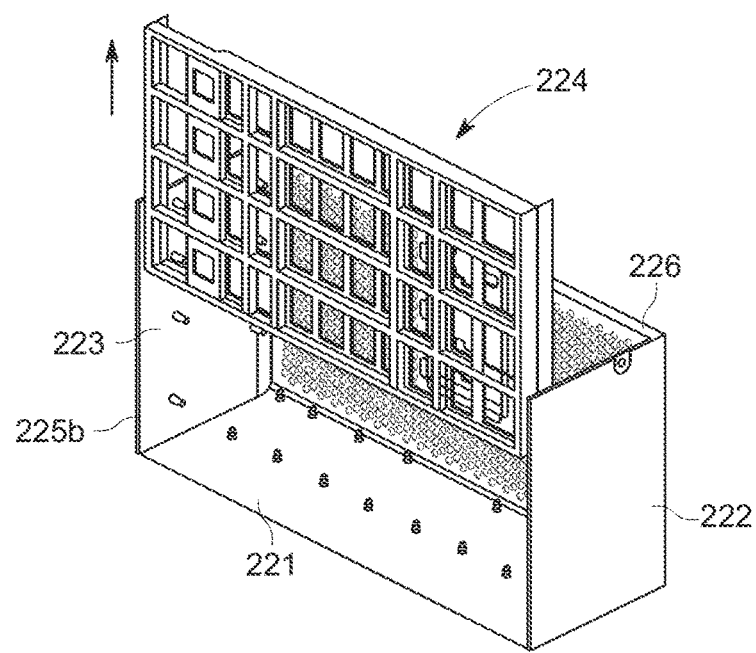
Figure 5C:
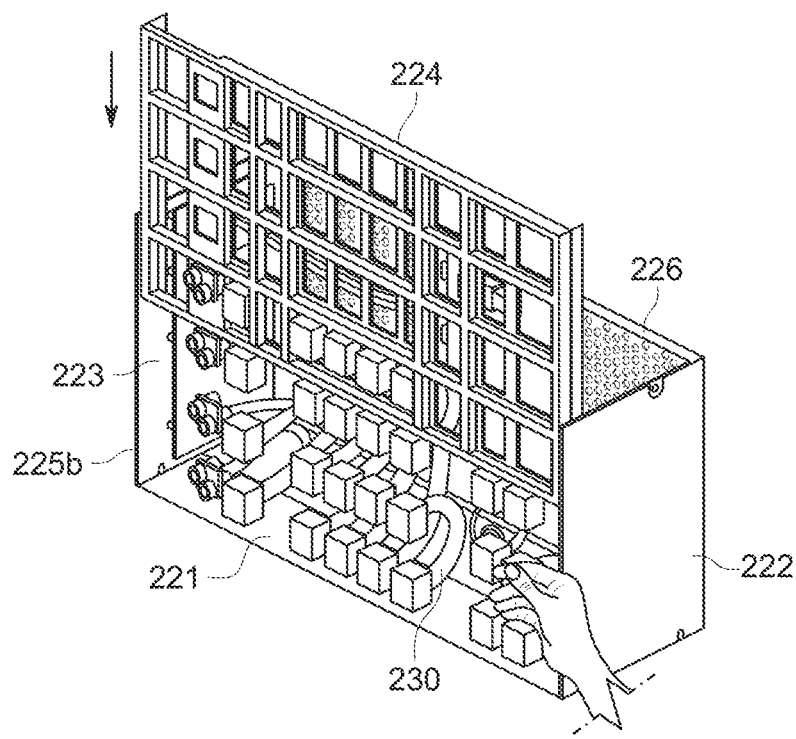
Figure 5D:
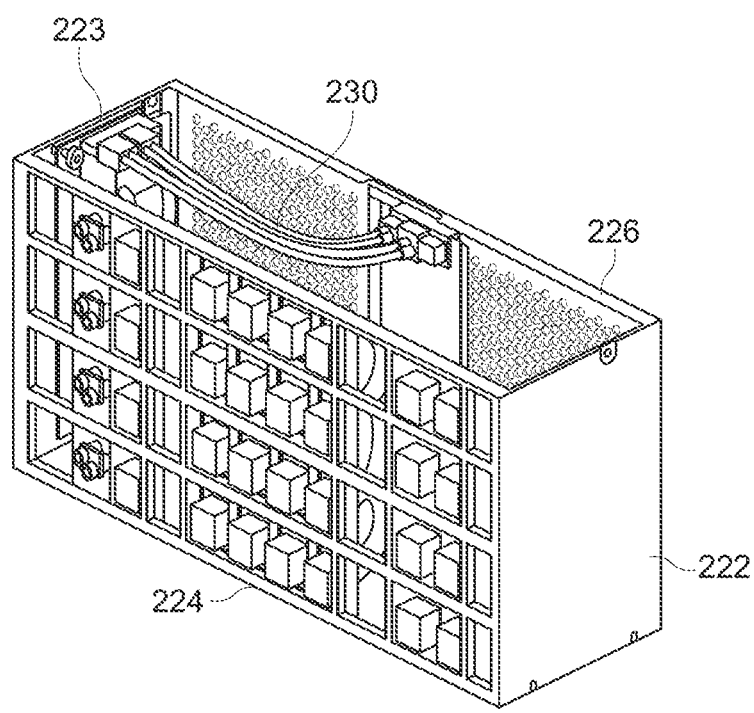

Referring to FIGS. 5A-5D, in some embodiments, the first panel assembly 224 is slidable along grooved rails 225a (now shown), 225b formed on the first plate 222 and the second plate 223, respectively, of the base frame assembly 260. In some embodiments, at least a portion of the first panel assembly 224 is always engaged with the grooved rails 225a, 225b even when the first panel assembly 224 is slid maximally. In some embodiments, the first panel assembly 224 is completely detachable from the base frame assembly 260 by sliding the first panel assembly 224 out of the grooved rails 225a, 225b. As shown in FIGS. 5A and 5B, the first panel assembly 224 is slid upward to provide an access to the area within the detachable cable cage 220. As shown in FIG. 5C, the plurality of cables 230 can be handled easily once the first panel assembly 224 is in the open position. As shown in FIGS. 5C and 5D, the first panel assembly 224 can be slid down to the closed position after the plurality of cables 230 are serviced.

Figure 6A:
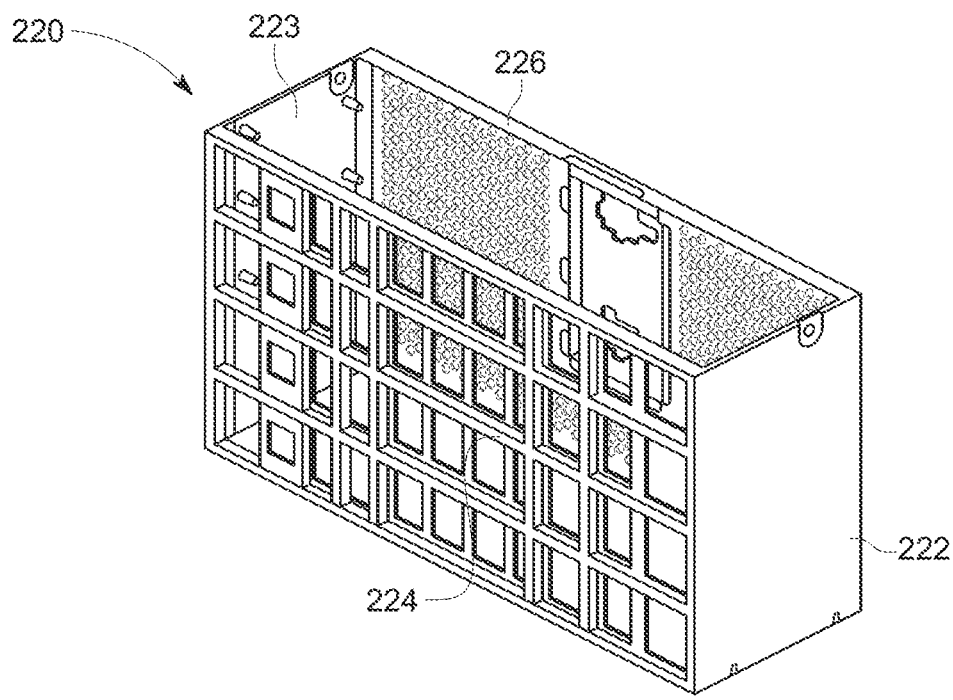
FIGS. 6A, 6B, 6C, and 6D are perspective views of a detachable cable cage with a detachable back panel assembly, according to certain aspects of the present disclosure.
Figure 6B:
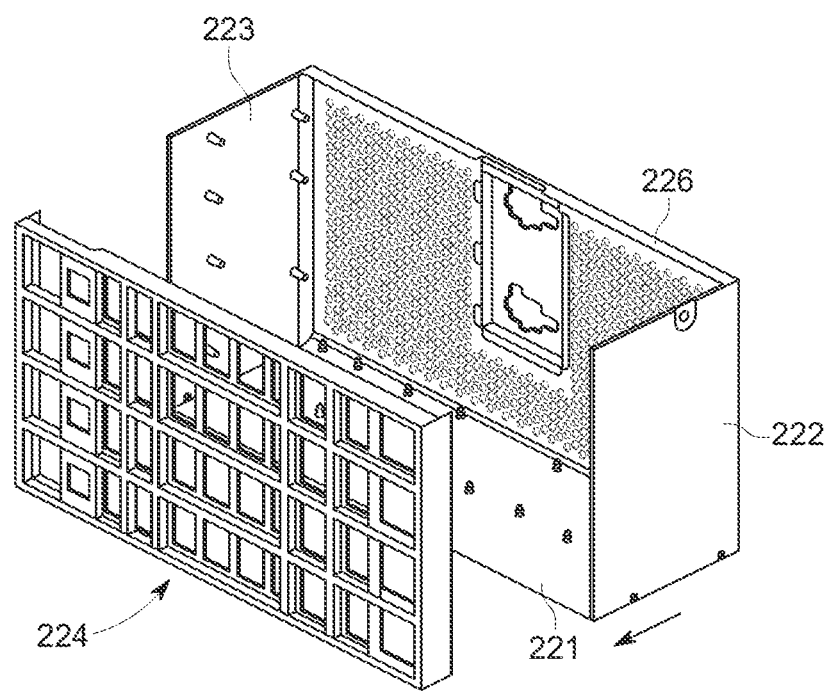
Figure 6C:
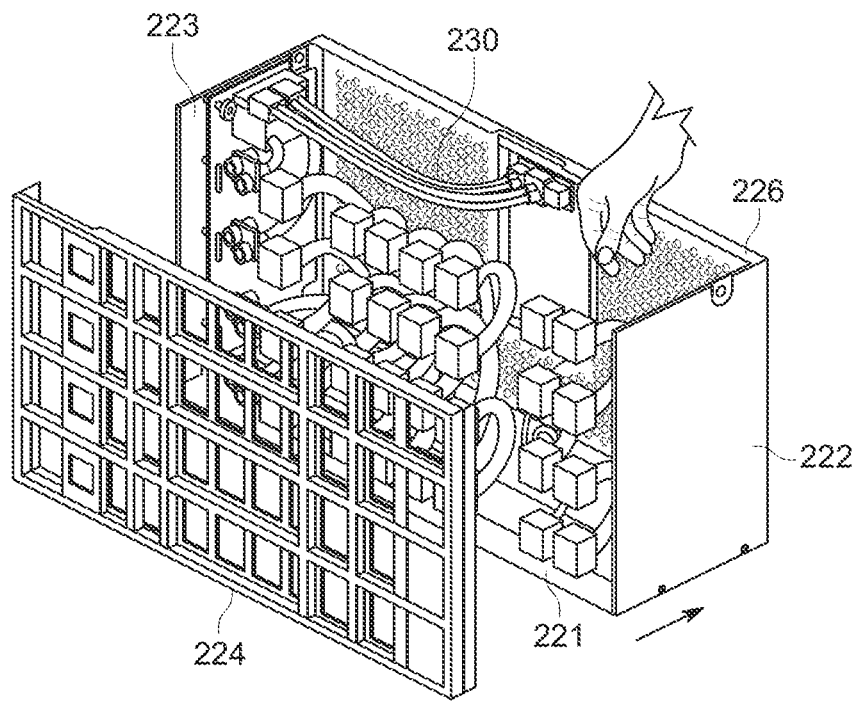
Figure 6D:
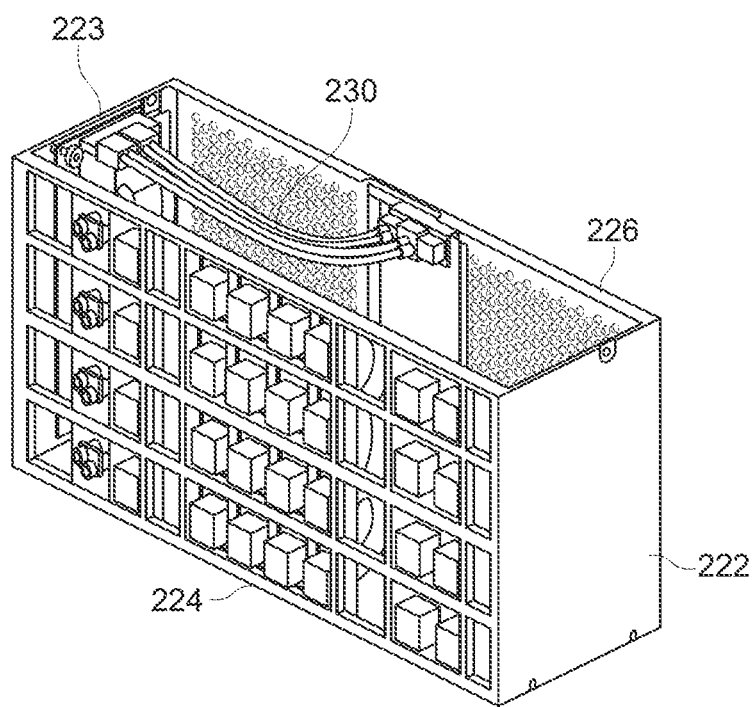

Referring to FIGS. 6A-6D, in some embodiments, the first panel assembly 224 is coupled to the base frame assembly 260 via a fastening mechanism with screws. In some embodiments, the screws are toolless screws. Thus, the first panel assembly 224 can be completely detached from the base frame assembly 260 by unfastening the screws. As shown in FIGS. 6A and 6B, the first panel assembly 224 can be completely detached by being pulled away from the first plate 222 and second plate 223. As shown in FIG. 6C, the plurality of cables 230 can be handled easily once the first panel assembly 224 is in the open position, and the first panel assembly 224 can be put back to the closed position after the plurality of cables 230 are serviced, as shown in FIG. 6D.

Figure 7A:
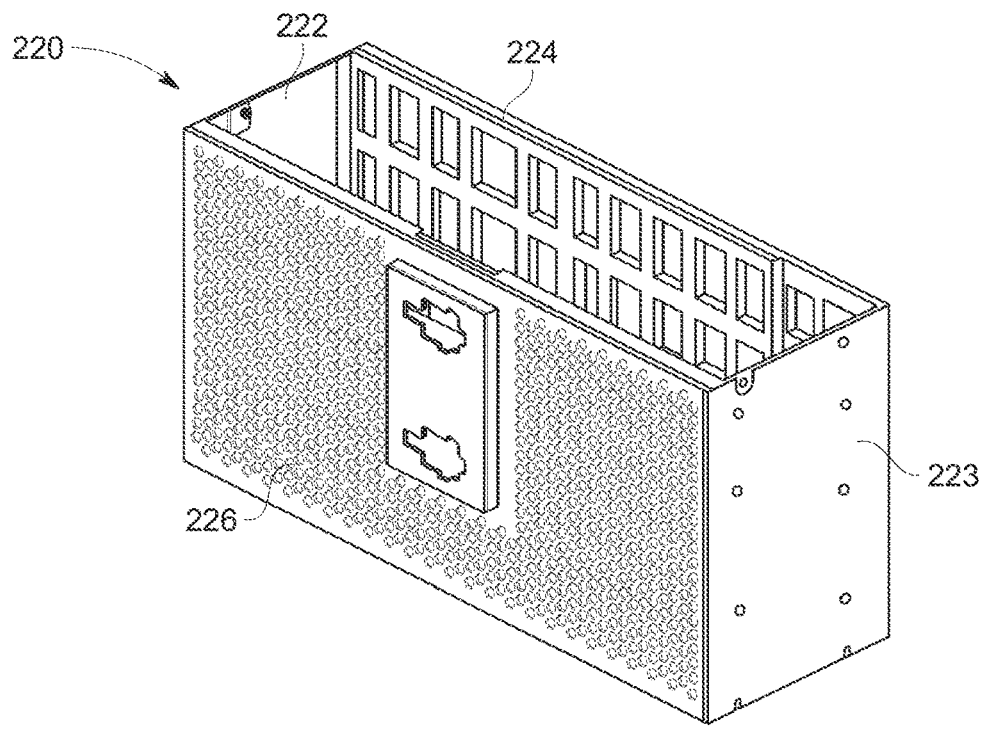
FIGS. 7A, 7B, 7C, and 7D are perspective views of a detachable cable cage with a flappable front panel assembly, according to certain aspects of the present disclosure.
Figure 7B:
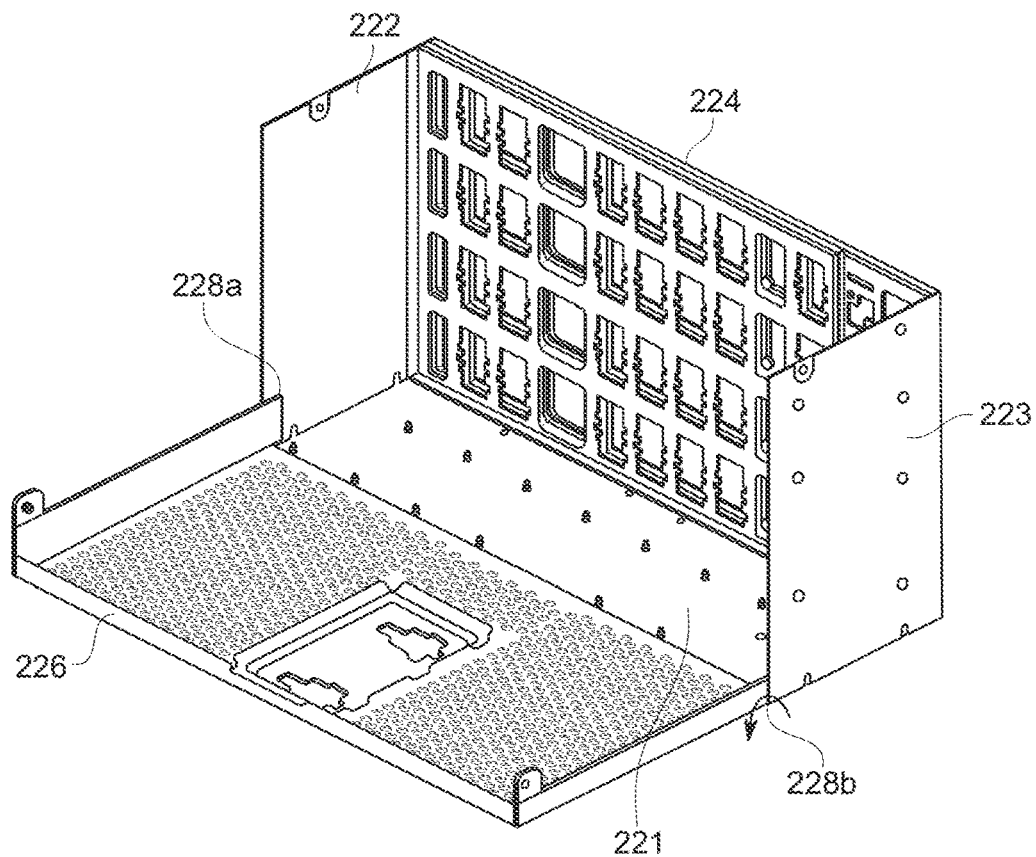
Figure 7C:
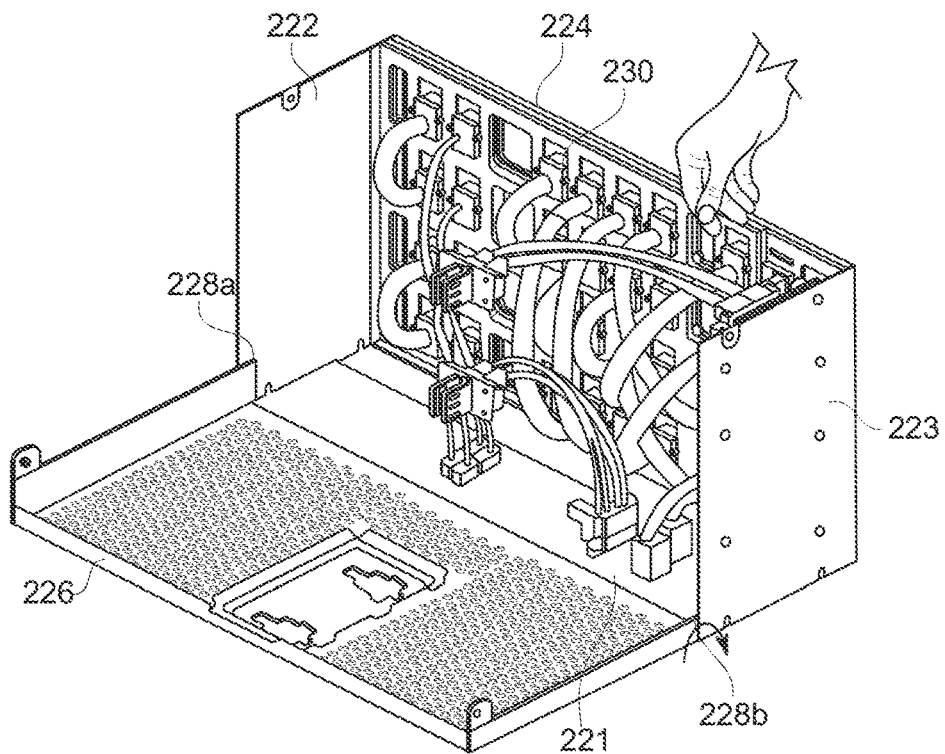
Figure 7D:
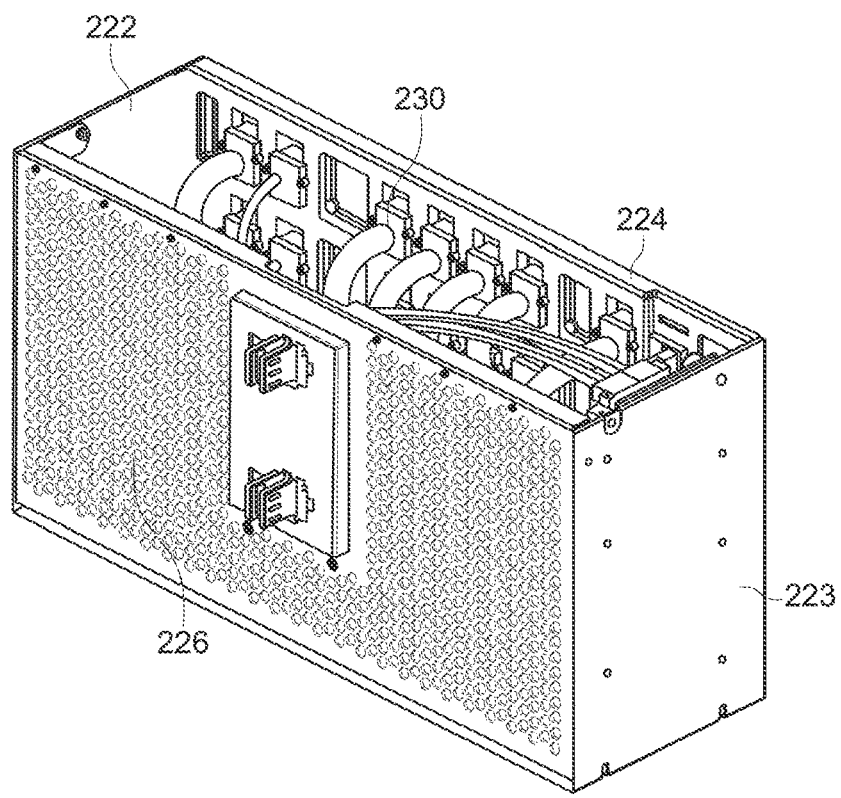

Referring to FIGS. 7A-7D, in some embodiments, the second panel assembly 226 is coupled to the base frame assembly 260 via rotatable hinges 228a, 228b. For example, one hinge 228a couples one end of the second panel assembly 226 to the first plate 222, and another hinge 228b couples the other end of the second panel assembly 226 to the second plate 223. Alternatively, one hinge 228a couples one end of the second panel assembly 226 to a portion of the bottom plate 221, and another hinge 228b couples the other end of the second panel assembly 226 to another portion of the bottom plate 221. Thus, the second panel assembly 226 is always coupled to the base frame assembly 260 regardless of whether the base frame assembly 260 is in a closed configuration or in an open configuration. In some embodiments, a fastening mechanism, such as screws, is necessary to hold the second panel assembly 226 in the closed position. The fastening mechanism needs to be released to open the second panel assembly 226, as shown in FIGS. 7A and 7B. As shown in FIG. 7C, the plurality of cables 230 can be handled easily once the second panel assembly 226 is in the open position. The second panel assembly 226 can be put back to the closed position after the plurality of cables 230 are serviced, as shown in FIGS. 7C and 7D.

Figure 8A:
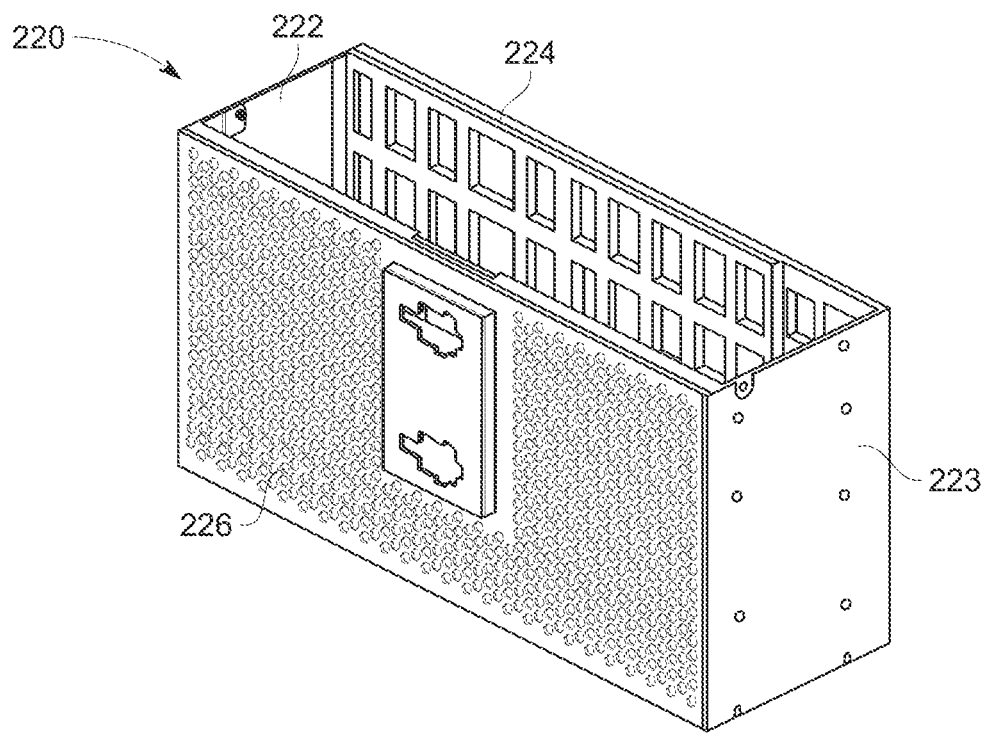
FIGS. 8A, 8B, 8C, and 8D are perspective views of a detachable cable cage with a slidable front panel assembly, according to certain aspects of the present disclosure.
Figure 8B:
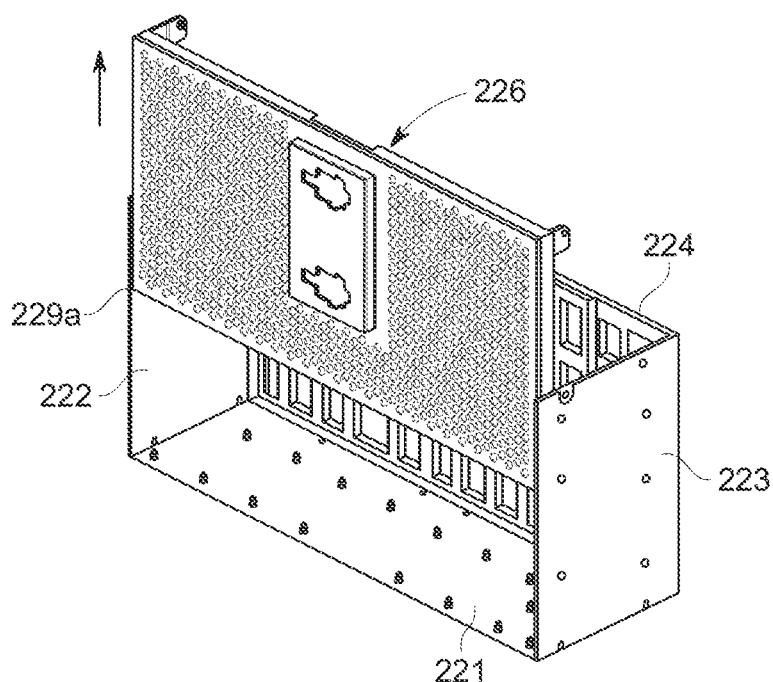
Figure 8C:
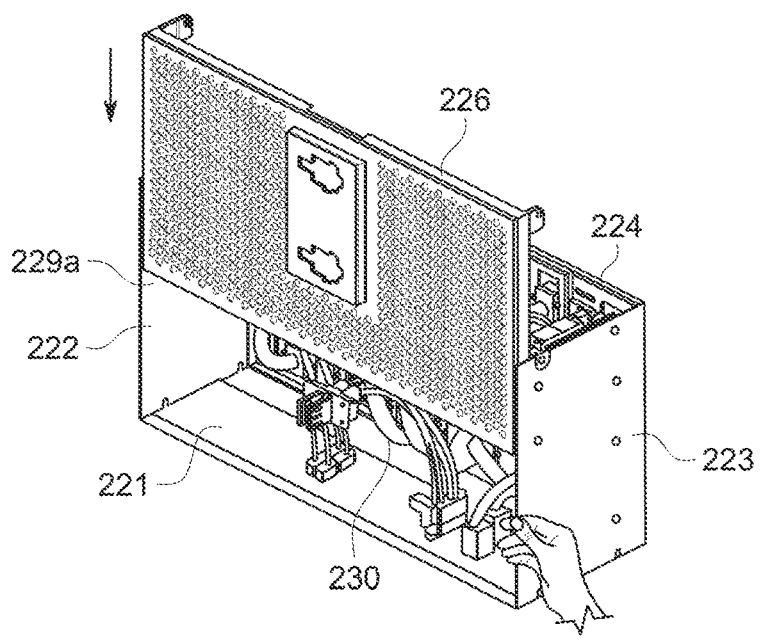
Figure 8D:
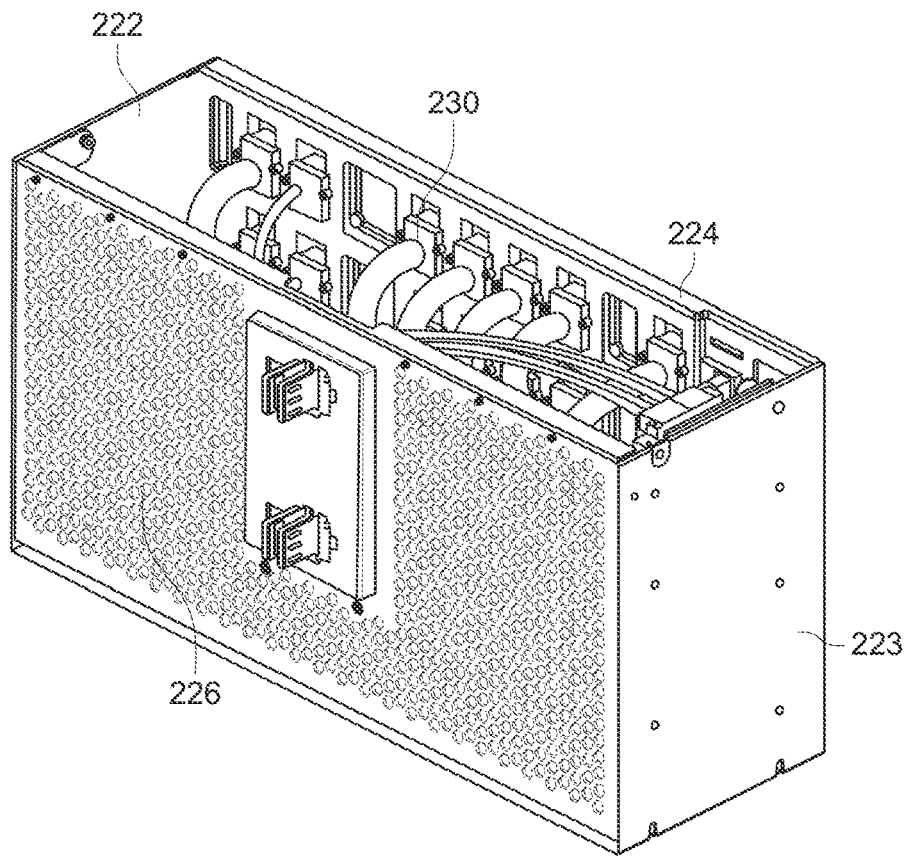

Referring to FIGS. 8A-8D, in some embodiments, the second panel assembly 226 is slidable along grooved rails 229a, 229b (now shown) formed on the first plate 222 and the second plate 223, respectively, of the base frame assembly 260. In some embodiments, at least a portion of the second panel assembly 226 is always engaged with the grooved rails 229a, 229b even when the second panel assembly 226 is slid maximally. In some embodiments, the second panel assembly 226 is completely detachable from the base frame assembly 260 by sliding the second panel assembly 226 out of the grooved rails 229a, 229b. As shown in FIGS. 8A and 8B, the second panel assembly 226 is slid upward to expose the inner space of the detachable cable cage 220. As shown in FIG. 8C, the plurality of cables 230 can be handled easily once the second panel assembly 226 is in the open position. As shown in FIGS. 8C and 8D, the second panel assembly 226 can be slid down to the closed position after the plurality of cables 230 are serviced.

Figure 9A:
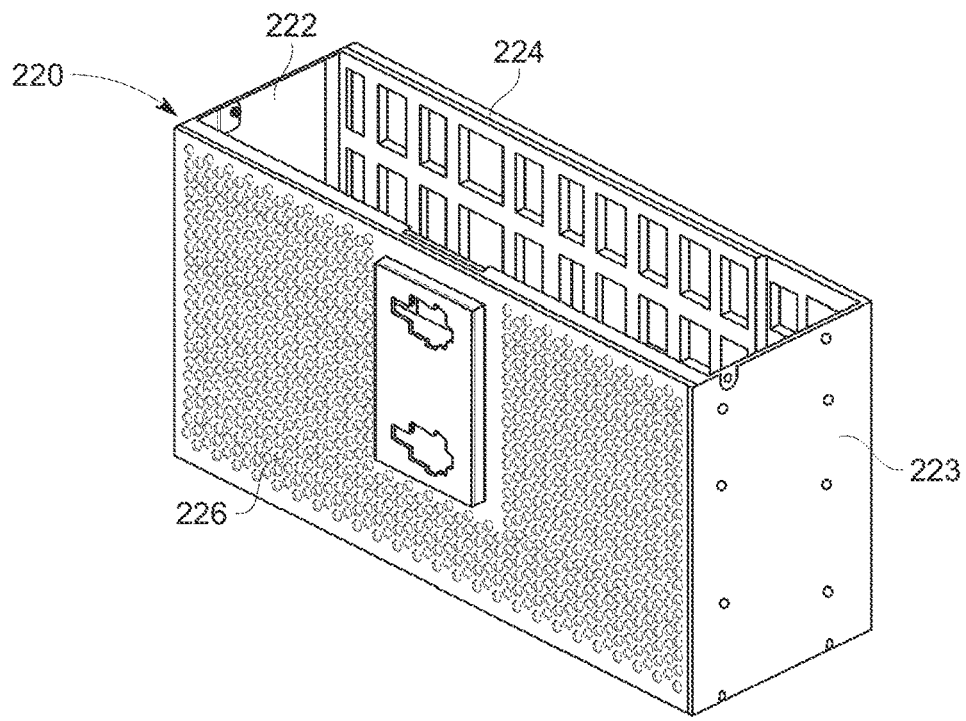
FIGS. 9A, 9B, 9C, and 9D are perspective views of a detachable cable cage with a detachable front panel assembly, according to certain aspects of the present disclosure.
Figure 9B:
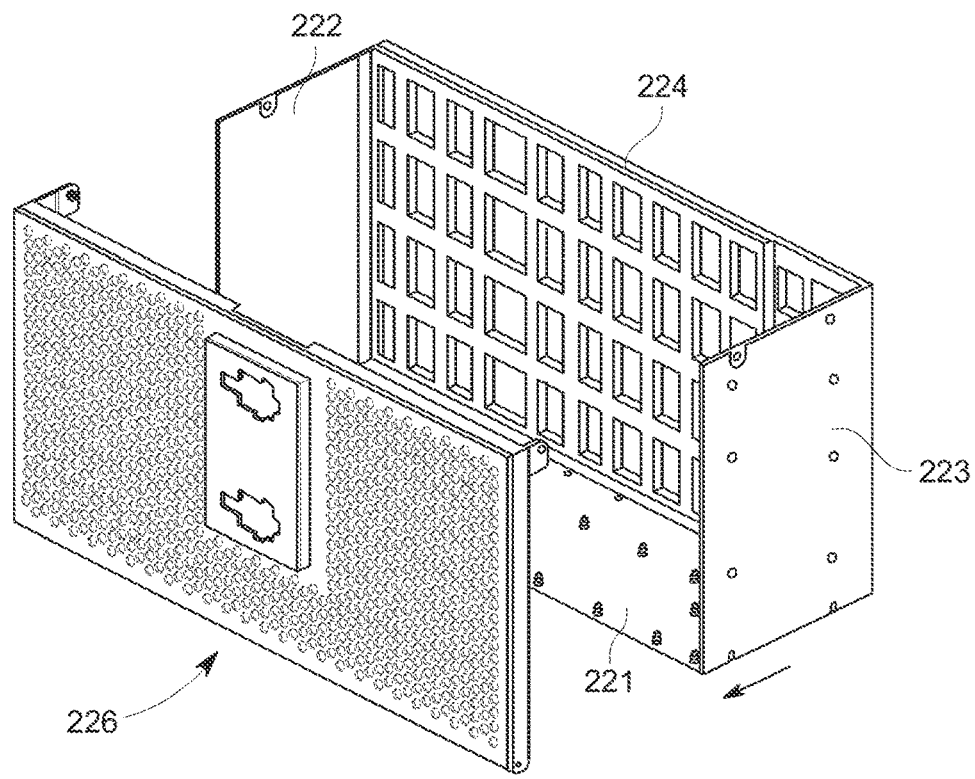
Figure 9C:
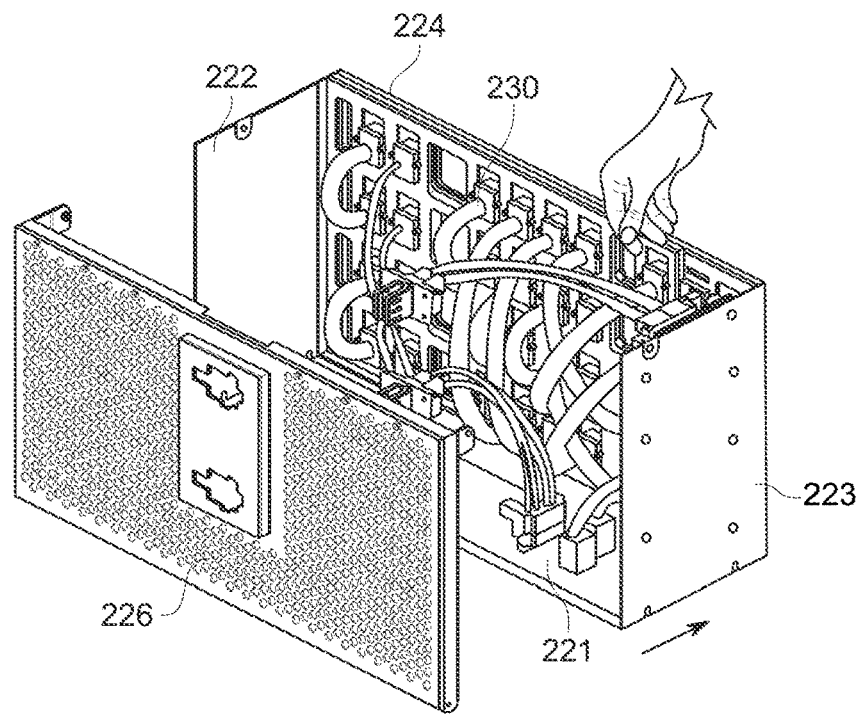
Figure 9D:
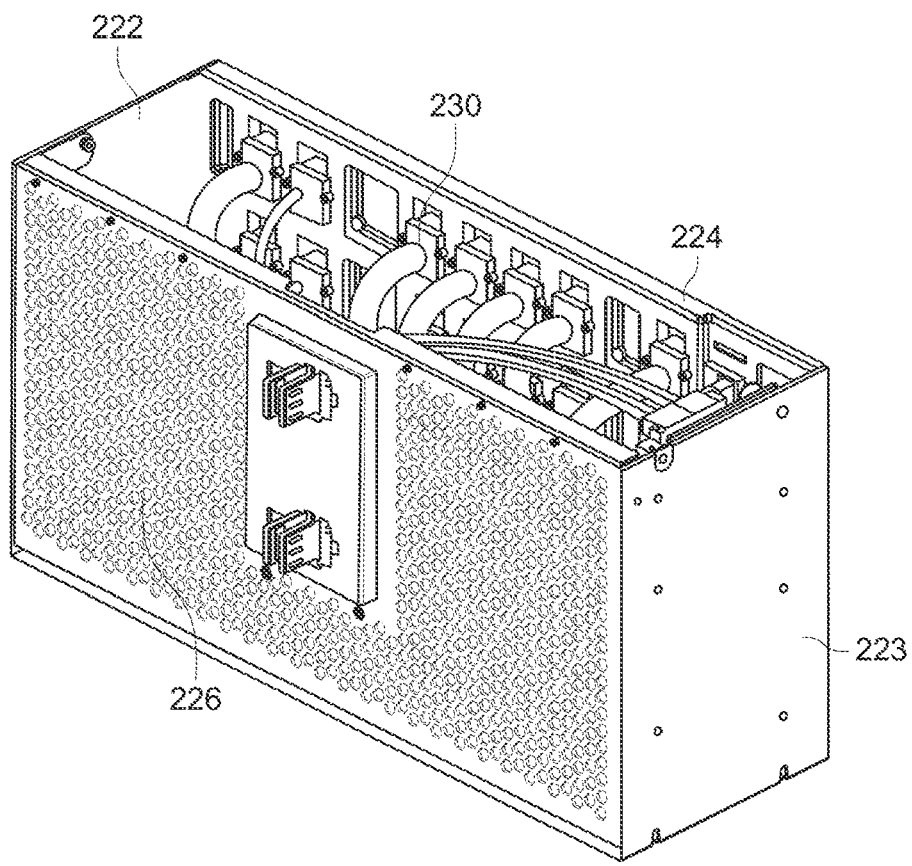

Referring to FIGS. 9A-9D, in some embodiments, the second panel assembly 226 is coupled to the base frame assembly 260 via a fastening mechanism with screws. In some embodiments, the screws are toolless screws. Thus, the second panel assembly 226 can be completely detached from the base frame assembly 260 by unfastening the screws. As shown in FIGS. 9A and 9B, the second panel assembly 226 is detached by being pulled away from the first plate 222 and second plate 223. As shown in FIG. 9C, the plurality of cables 230 can be handled easily once the second panel assembly 226 is in the open position, and the second panel assembly 226 can be put back to the closed position after the plurality of cables 230 are serviced, as shown in FIG. 9D.

In some embodiments, both the first panel assembly 224 and the second panel assembly 226 are movable between a closed position and an open position. In some embodiments, only one of the first panel assembly 224 and the second panel assembly 226 is movable between a closed position and an open position.

As exemplified in various figures, in some embodiments, the first panel assembly 224 has a lattice allowing passage of the plurality of cables 230 through the lattice. In some embodiments, the second panel assembly 226 is meshed such that air can flow through meshes.

Figure 10A:
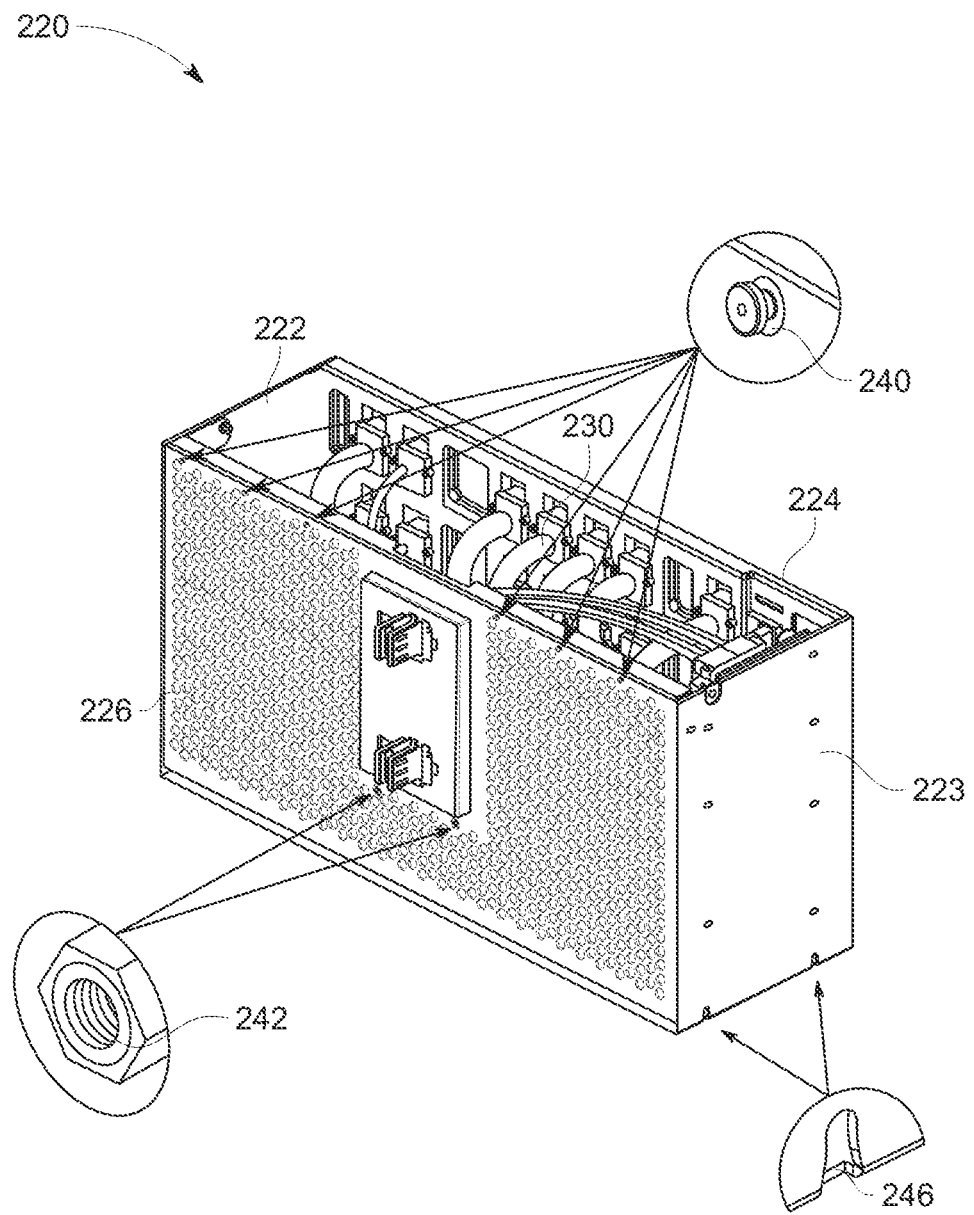
FIG. 10A is a front perspective view of a detachable cable cage, according to certain aspects of the present disclosure.
Figure 10B:
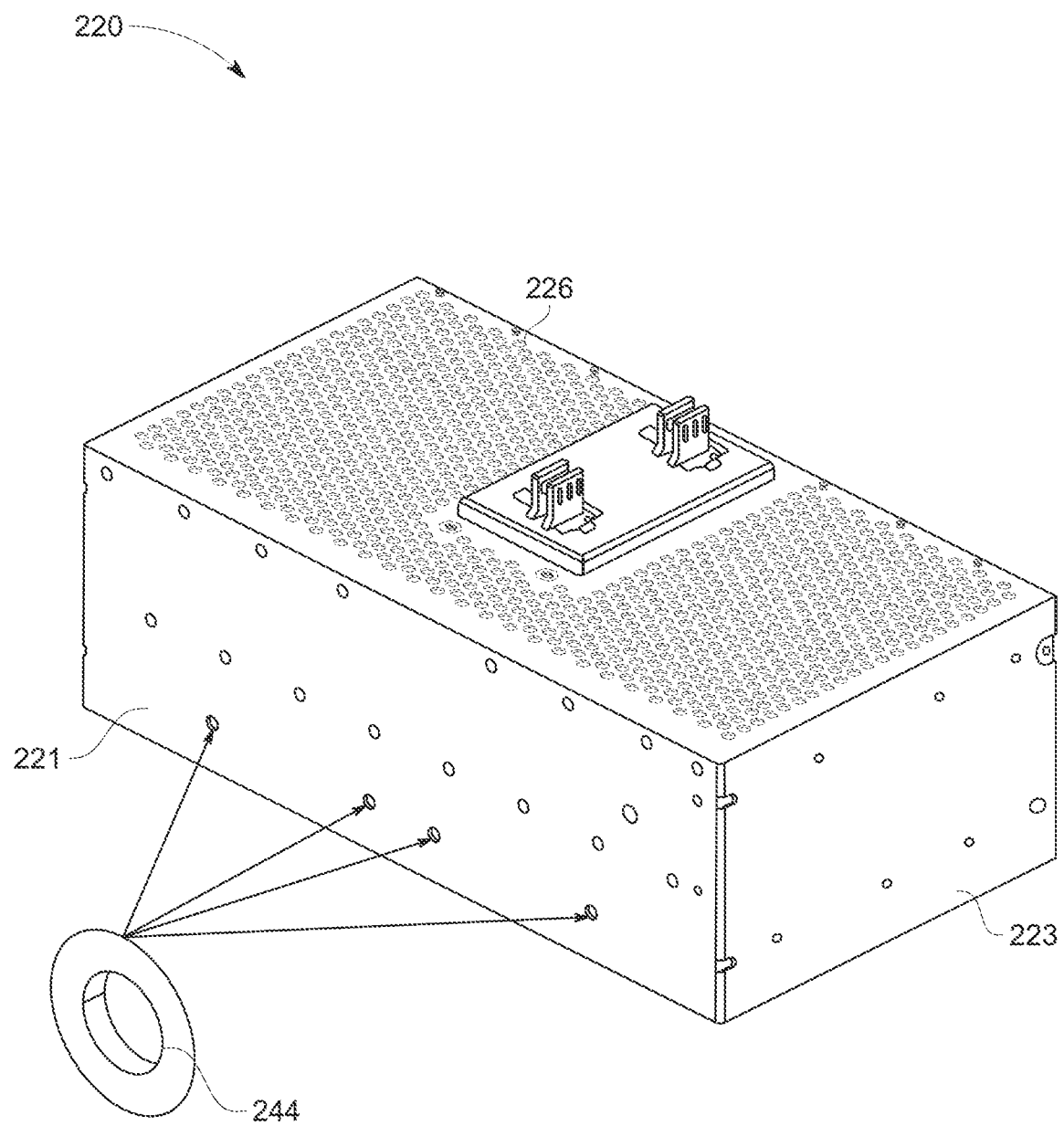
FIG. 10B is a bottom perspective view of a detachable cable cage, according to certain aspects of the present disclosure.

As exemplified in FIGS. 10A-12B, in some embodiments, there are various coupling mechanisms for assembling the cable cage 220 to the chassis 210 of the multi-node computing system 200. In some embodiments, referring to FIG. 10A, the cable cage 220 has pins 240 formed at a portion of the second panel assembly 226. For example, the pins 240 are T-pins. In some embodiments, the pins 240 are formed on a top portion of the external surface of the second panel assembly 226. In some embodiments, the second panel assembly 226 has at least one screw hole 242. Referring to FIG. 10B, in some embodiments, the bottom plate 221 has a plurality of holes 244. Referring to FIG. 10A, the cable cage 220 also has a plurality of holes 246 formed on the first plate 222 and the second plate 223.

Figure 11A:
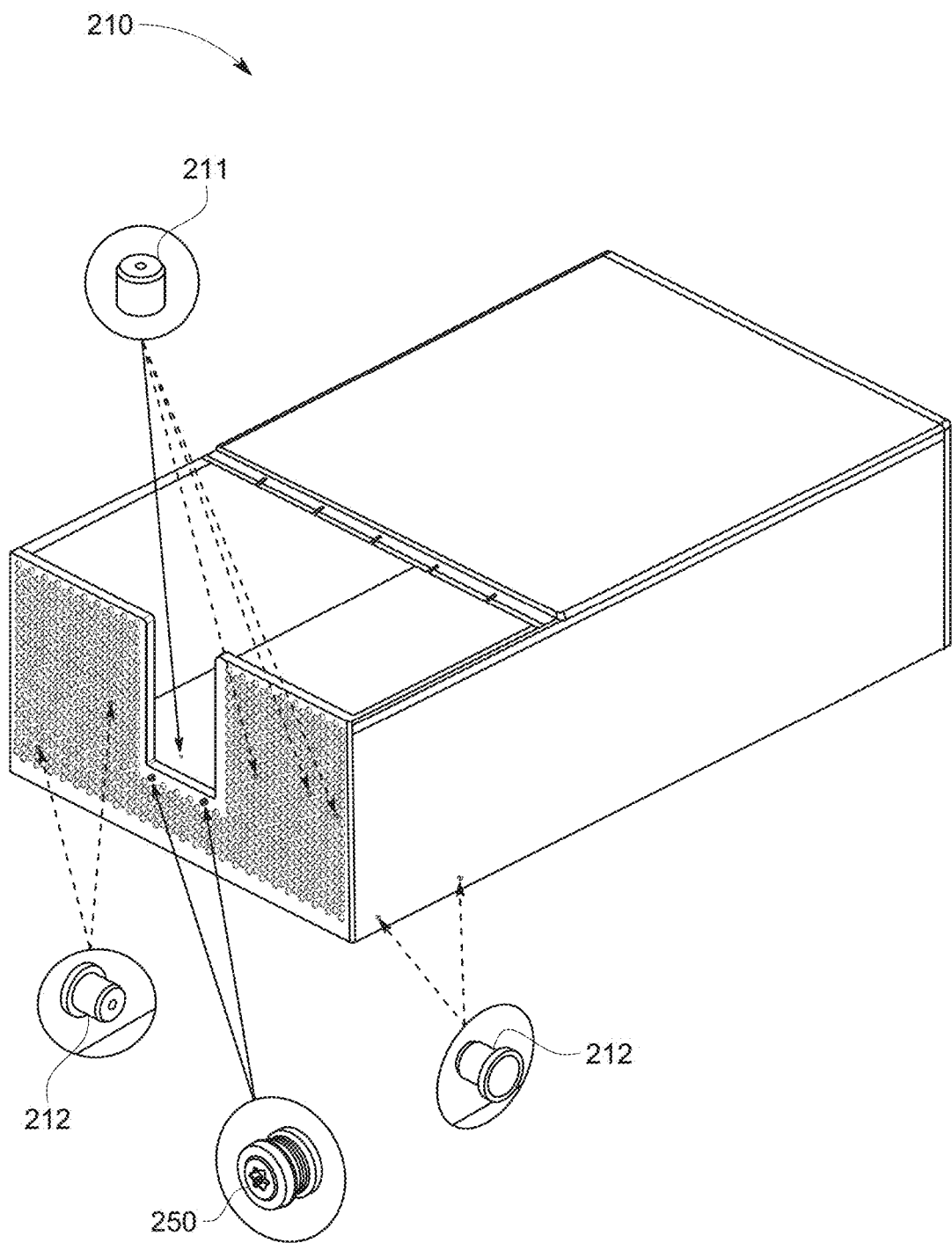
FIG. 11A is a front perspective view of a chassis, according to certain aspects of the present disclosure.

In some embodiments, referring to FIG. 11A, the chassis 210 has a plurality of location pins 211 protruding from a bottom plate where the cable cage 220 is received. In some embodiments, a guiding pin 212 is formed on each inner surface of both side plates of the chassis 210. In some embodiments, the guiding pin 212 is formed at a lower portion of the inner surface of the side plate of the chassis 210. In some embodiments, more than one guiding pin 212 are formed on each side plate of the chassis 210. In some embodiments, thumbscrews 250 are coupled to the external surface of the front side of the chassis 210 such that the thumbscrews 250 pass through holes formed on the chassis 210.

Figure 11B:
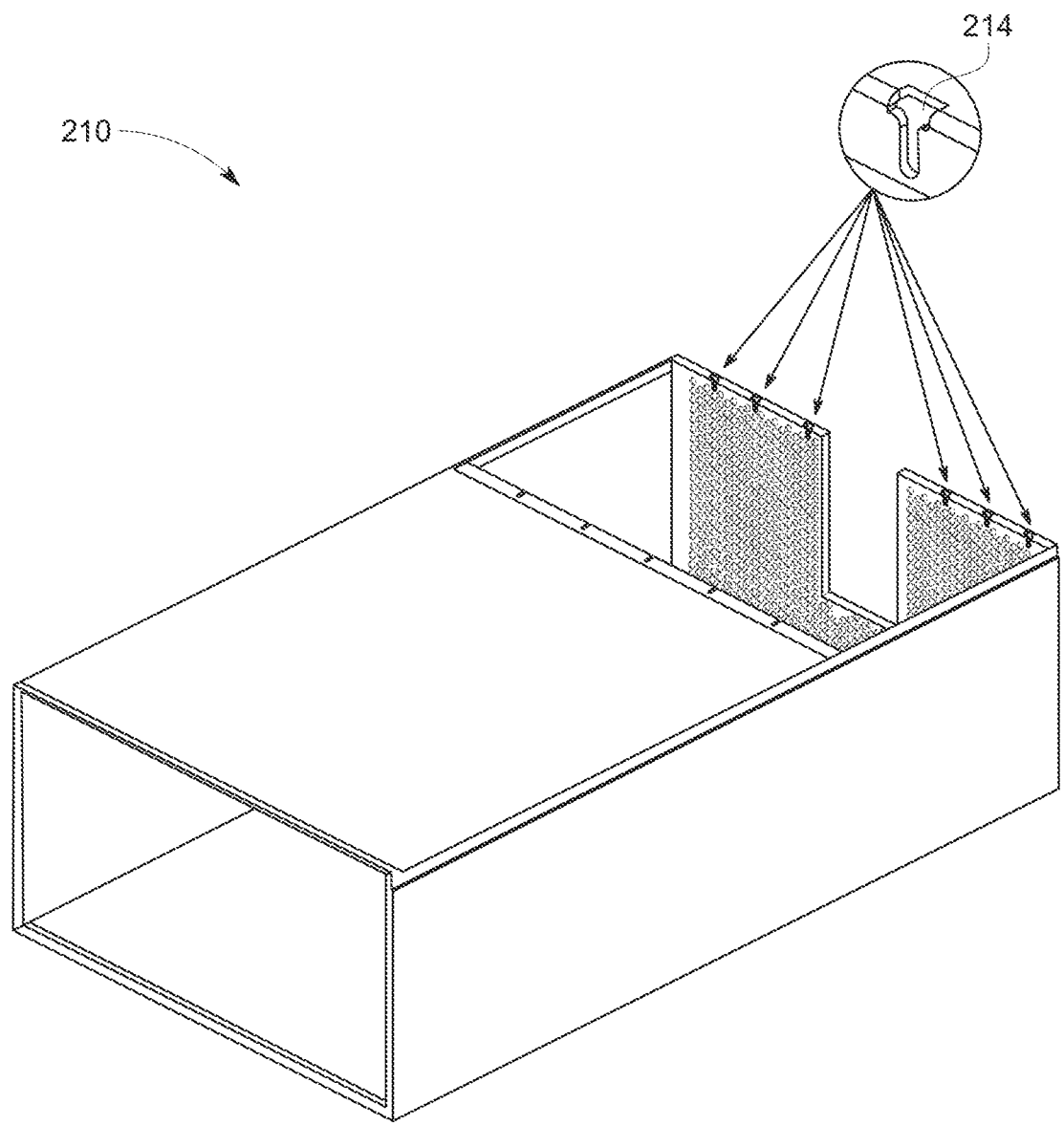
FIG. 11B is a rear perspective view of a chassis, according to certain aspects of the present disclosure.

In some embodiments, referring to FIG. 11B, a plurality of holes 214 are formed on the chassis 210. In some embodiments, the holes 214 are formed on the inner surface of the front side of the chassis 210. In some embodiments, the holes 214 are elongated.

Figure 12A:
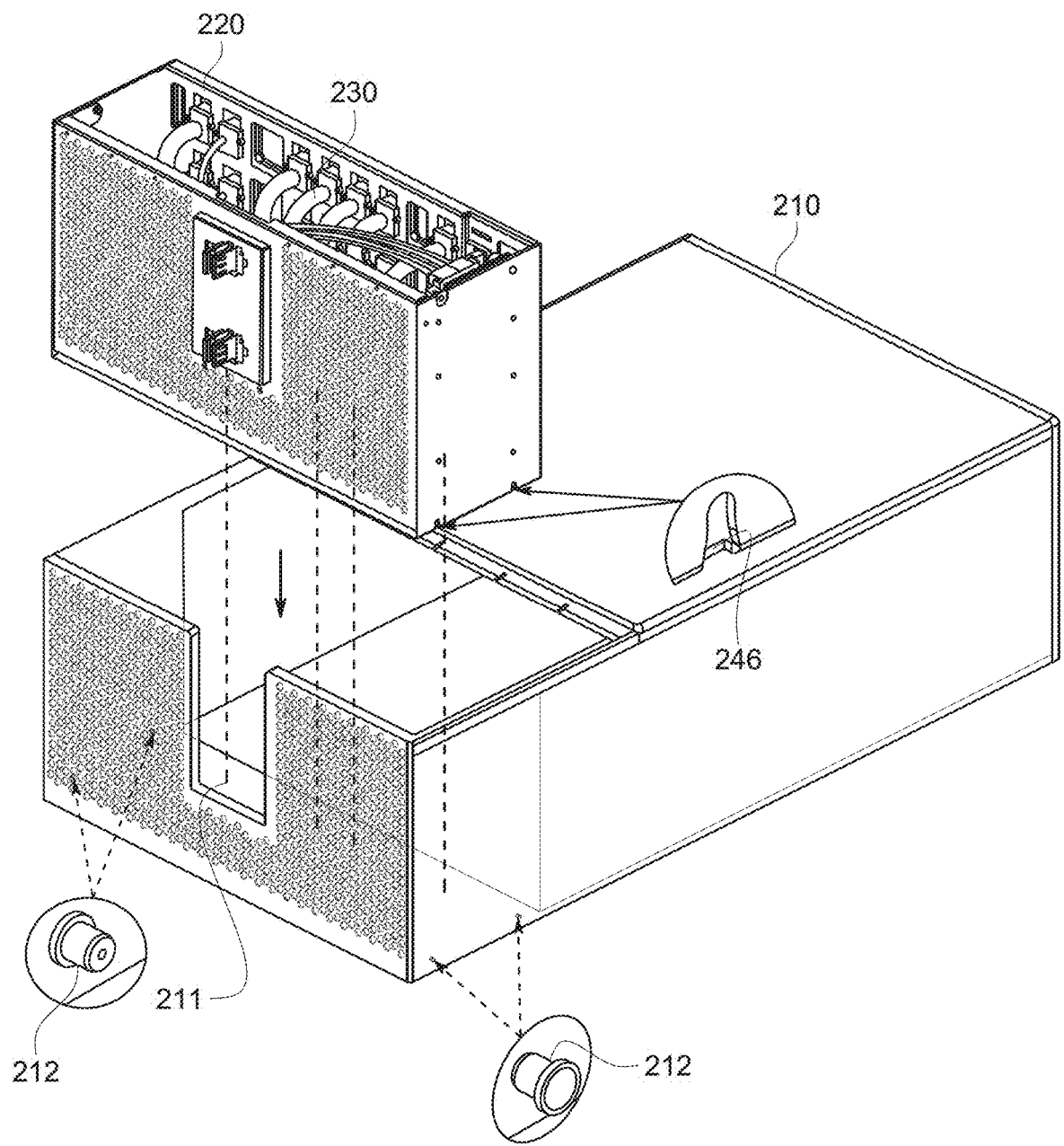
FIG. 12A is a front perspective view of the chassis shown in FIGS. 11A and 11B with the cable cage shown in FIGS. 10A and 10B detached therefrom, according to certain aspects of the present disclosure.

In some embodiments, referring to FIG. 12A, the plurality of location pins 211 formed on the bottom plate of the chassis 210 are inserted into the plurality of holes 244 of the cable cage 220 when the cable cage 220 is assembled to the chassis 210. Engagement of the plurality of location pins 211 to the plurality of holes 244 allows stable positioning of the cable cage 220 in the chassis 210.

Figure 12B:
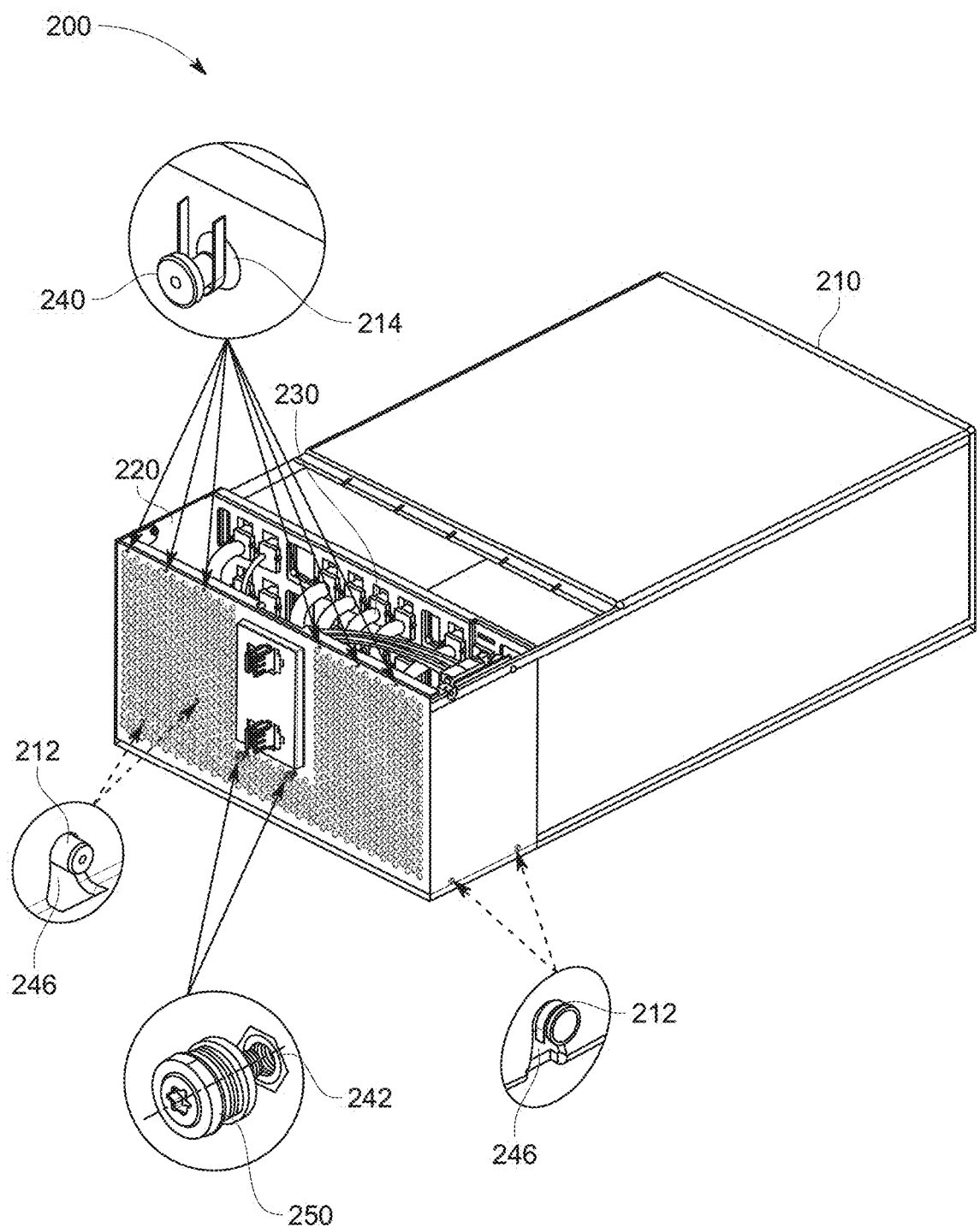
FIG. 12B is a front perspective view of the chassis shown in FIGS. 11A and 11B with the cable cage shown in FIGS. 10A and 10B assembled thereto, according to certain aspects of the present disclosure.

Moreover, referring to FIG. 12B, the pins 240 of the assembled cable cage 220 are engaged with the plurality of holes 214 formed on the chassis 210. For example, the pins 240 having a circular head portion and a neck portion are inserted into the respective plurality of holes 214 such that the neck portion contacts a concave portion of the holes 214 formed at the front side of the chassis 210. Thus, the cable cage 220 is more stably assembled to the chassis 210. Further, the guiding pin 212 of the chassis 210 is engaged with the plurality of holes 246 formed on the cable cage 220. When the technician assembles the cable cage 220 to the chassis 210, he or she will feel confident that the cable cage 220 is placed at a correct position within the chassis 210 by realizing that the plurality of holes 246 of the cable cage 220 are engaged with the guiding pins 212. In some embodiments, the cable cage 220 is detachably fixed to the chassis 210 by the thumbscrews 250 fastened to the screw holes 242. The above discussed coupling mechanisms ensure that the cable cage 220 assembled to the chassis 210 is stably fixed, preventing movement of the cable cage 220 within the chassis 210.

Figure 13A:
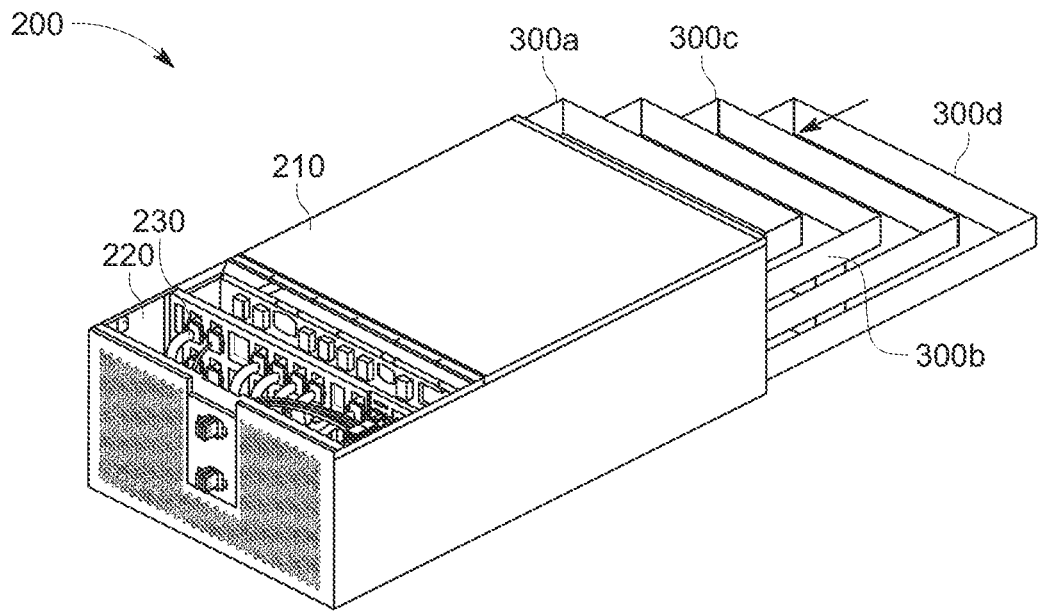
FIGS. 13A and 13B are perspective views of a multi-node computing system with multiple nodes, a detachable cable cage, and a plurality of cables, according to certain aspects of the present disclosure.
Figure 13B:
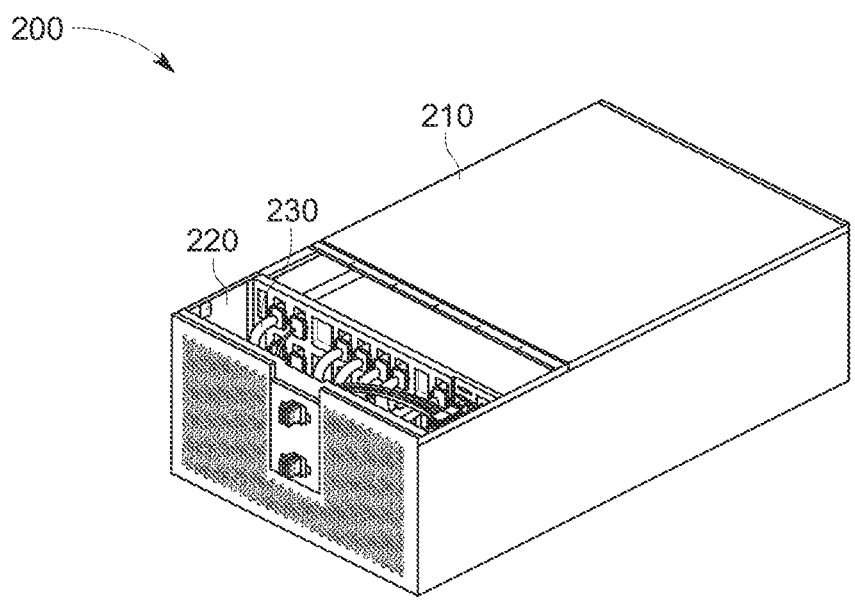

Referring to FIGS. 13A and 13B, the multi-node computing system 200 including the detachable cable cage 220 receives a plurality of nodes 300a, 300b, 300c, 300d in the chassis 210. Cables 230 routed and connected to the plurality of nodes 300a, 300b, 300c, 300d can be configured by detaching and opening the cable cage 220 as discussed above. Thus, regardless of the position of the nodes 300a, 300b, 300c, 300d, cables 230 connected thereto can be reached easily by opening at least one of the first panel assembly 224 and second panel assembly 226 of the detached cable cage 220. The detachable and openable configuration of the cable cage 220 will prevent cable misconnection.

In some embodiments, a method for servicing a plurality of cables 230 within a cable cage 220 detachably coupled to a multi-node computing system 200 starts by detaching the cable cage 220 from a chassis 210 of the multi-node computing system 200. The method is followed by opening a first panel assembly 224 or a second panel assembly 226 of the cable cage 220 movingly coupled to a base frame assembly 260 of the cable cage 220 such that the cable cage 220 is placed in an open configuration. The internal space of the detachable cable cage 220 is accessible in the open configuration. Then the plurality of cables 230 is serviced to be routed or connected to one or more electronic devices or nodes 300a, 300b, 300c, 300d mounted within the chassis 210. After the plurality of cables 230 is serviced, the method is completed by closing the first panel assembly 224 or second panel assembly 226 and assembling the cable cage 220 that is in a closed configuration to the chassis 210.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A multi-node computing system comprising:
   a chassis;
   one or more electronic devices mounted within the chassis; and
   a detachable cable cage removably mounted within the chassis, the detachable cable cage including:
      a base frame assembly having a bottom plate connecting a first plate and a second plate, the first plate extending generally vertically from one end of the bottom plate, the second plate extending generally vertically from another end of the bottom plate, the first and second plate facing each other and extending across a width of the base frame assembly between a first side and a second side of the base frame assembly;

a first panel assembly forming one side of the detachable cable cage, the first panel assembly being movingly coupled to the first side of the base frame assembly; and a second panel assembly forming another side of the detachable cable cage, the second panel assembly being movingly coupled to the second side of the base frame assembly, the first panel assembly and the second panel assembly being generally parallel such that the first panel assembly faces the second panel assembly, wherein both the first panel assembly and the second panel assembly, which have different shapes, are switchable between a closed position and an open position such that an internal space of the detachable cable cage is accessible from both sides of the detachable cable cage in the open position.

2. The multi-node computing system of claim 1, further comprising a plurality of cables positioned within the detachable cable cage, the plurality of cables being connected to the one or more electronic devices.

3. The multi-node computing system of claim 2, wherein the first panel assembly has a lattice allowing passage of the plurality of cables through the lattice.

4. The multi-node computing system of claim 3, wherein the second panel assembly is meshed such that air can flow through meshes.

5. The multi-node computing system of claim 4, wherein the second panel assembly of the detachable cable cage mounted within the chassis contacts one side wall of the chassis or is in close proximity to the one side wall.

6. The multi-node computing system of claim 2, wherein the detachable cable cage mounted within the chassis is located at one end portion of the chassis, the plurality of cables positioned within the detachable cable cage being connected to the one or more electronic devices within the chassis.

7. The multi-node computing system of claim 1, wherein the detachable cable cage is fixed to the chassis via toolless fasteners.

8. The multi-node computing system of claim 1, wherein the first panel assembly is coupled to the base frame assembly via a rotatable hinge.

9. The multi-node computing system of claim 1, wherein the first panel assembly is slidable along grooved rails formed on the first plate and the second plate of the base frame assembly.

10. The multi-node computing system of claim 1, wherein the first panel assembly is coupled to the base frame assembly via a fastening mechanism with toolless screws.

11. The multi-node computing system of claim 1, wherein the second panel assembly is coupled to the base frame assembly via a rotatable hinge.

12. The multi-node computing system of claim 1, wherein the second panel assembly is slidable along grooved rails formed on the first plate and the second plate of the base frame assembly.

13. The multi-node computing system of claim 1, wherein the second panel assembly is coupled to the base frame assembly via a fastening mechanism with toolless screws.

14. The multi-node computing system of claim 1, wherein the chassis comprises at least:

a plurality of location pins configured to be engaged with holes formed on the bottom plate of the base frame assembly;

a plurality of guiding pins configured to be engaged with holes formed on the first and second plates of the base frame assembly;

a plurality of holes configured to be engaged with pins or T-pins located on the second panel assembly; and/or at least two thumbscrews configured to be engaged with screw holes formed on the second panel assembly.

15. The multi-node computing system of claim 14, wherein when the cable cage is assembled to the chassis:

the plurality of location pins engages with the holes formed on the bottom plate of the base frame assembly;

the plurality of guiding pins engages with the holes formed on the first and second plates of the base frame assembly;

the plurality of holes engages with the pins or T-pins located on the second panel assembly; and the at least two thumbscrews engage with the screw holes formed on the second panel assembly.

16. The multi-node computing system of claim 1, wherein the chassis comprises:

a plurality of location pins configured to be engaged with holes formed on the bottom plate of the base frame assembly;

a plurality of guiding pins configured to be engaged with holes formed on the first and second plates of the base frame assembly; and a plurality of holes configured to be engaged with pins or T-pins located on the second panel assembly.

17. A multi-node computing system configured to receive one or more electronic devices, the multi-node server system comprising:

a chassis;

a detachable cable cage removably mounted within the chassis; and a plurality of cables positioned within the detachable cable cage and connected to the one or more electronic devices mounted within the chassis, the detachable cable cage including:

a base frame assembly having a bottom plate connecting a first plate and a second plate facing each other and extending across a width of the base frame assembly between a first side and a second side of the base frame assembly;

a back panel assembly movingly coupled to the first side of the base frame assembly to form one side of the detachable cable cage, the back panel assembly being movable between a closed position and an open position, and an internal space of the cable cage being exposed when the cable cage is detached from the chassis and the back panel assembly is in the open position such that the plurality of cables are accessible from a first direction corresponding to the first side; and a front panel assembly movingly coupled to the second side of the base frame assembly to form another side of the detachable cable cage, the front panel assembly being movable between a closed position and an open position, and the internal space of the cable cage being exposed when the cable cage is detached from the chassis and the front panel assembly is in the open position such that the plurality of cables are accessible from a second direction corresponding to the second side, the first direction and the second direction being opposite directions, wherein the front panel assembly of the detachable cable cage mounted within the chassis faces an inner wall of a front side of the chassis, and wherein the bottom plate of the detachable frame assembly is placed on a bottom plate of the chassis when the detachable cable cage is mounted within the chassis.

18. The multi-node computing system of claim 17, wherein at least one of the back panel assembly and the front panel assembly is coupled to the base frame assembly via a rotatable hinge, grooved rails formed on the first plate and the second plate of the base frame assembly, or a fastening mechanism with screws.

19. The multi-node computing system of claim 17, wherein the chassis comprises at least one of:
   a plurality of location pins configured to be engaged with holes formed on the bottom plate of the base frame assembly;
   a plurality of guiding pins configured to be engaged with holes formed on the first and second plates of the base frame assembly;
   a plurality of holes configured to be engaged with pins or T-pins located on the front panel assembly; and/or
   at least two thumbscrews configured to be engaged with screw holes formed on the front panel assembly.

20. The multi-node computing system of claim 17, wherein the chassis comprises:
   a plurality of location pins configured to be engaged with holes formed on the bottom plate of the base frame assembly;
   a plurality of guiding pins configured to be engaged with holes formed on the first and second plates of the base frame assembly; and
   a plurality of holes configured to be engaged with pins or T-pins located on the front panel assembly.

* * * * *